US012737169B2

(12) United States Patent
Karani et al.

(10) Patent No.: US 12,737,169 B2
(45) Date of Patent: Sep. 15, 2026

(54) AUTONOMOUS CONFIGURATION-BASED RELEASE ORCHESTRATION

(71) Applicant: Salesforce, Inc., San Francisco, CA (US)

(72) Inventors: Vijay Karani, Fremont, CA (US); Arunabha Ghosh, San Jose, CA (US); Firas Saltaji, Mississauga (CA); Varun Arvind Jobanputra, New York, NY (US); Brian Whitten, Burlingame, CA (US)

(73) Assignee: Salesforce, Inc., San Francisco, CA (US)

( * ) Notice: Subject to any disclaimer, the term of this patent is extended or adjusted under 35 U.S.C. 154(b) by 107 days.

(21) Appl. No.: 18/429,402

(22) Filed: Jan. 31, 2024

(65) Prior Publication Data

US 2025/0244992 A1 Jul. 31, 2025

(51) Int. Cl.
*G06F 8/65* (2018.01)
*G06F 11/07* (2006.01)

(52) U.S. Cl.
CPC ............ *G06F 8/65* (2013.01); *G06F 11/0721* (2013.01); *G06F 11/0793* (2013.01)

(58) Field of Classification Search
CPC ..... G06F 8/65; G06F 11/0721; G06F 11/0793
See application file for complete search history.

(56) References Cited

U.S. PATENT DOCUMENTS 10,708,420 B2 7/2020 Karani
10,795,662 B2 10/2020 Gadgil et al.
10,810,248 B2 * 10/2020 Tang .................... G06F 16/219
11,245,789 B2 2/2022 Karani
11,354,113 B1 * 6/2022 Verma .................. H04L 41/082
11,507,364 B2 11/2022 Duvur et al.
11,544,052 B2 * 1/2023 Liljeback .................. G06F 8/60
11,593,100 B2 * 2/2023 Mathew ................ G06F 9/5016
(Continued)

OTHER PUBLICATIONS

"3 Tools to Automate your Kubernetes Cluster Deployment!", blog, 10 pages, Medium, San Francisco, CA, USA, Retrieved from https://medium.com/buildpiper/3-tools-to-automate-your-kubernetes-cluster-deployment-cc727bc11159 (Year: 2024).
(Continued)

*Primary Examiner* — Douglas M Slachta
(74) *Attorney, Agent, or Firm* — Nicholson De Vos Webster & Elliott LLP

(57) ABSTRACT

A method and apparatus for autonomous configuration-based release orchestration. A first engine obtains stagger configuration data that includes an indication of container clusters in each stagger and a stagger order, selects a current stagger based on the order, and attempts to deploy the feature release to the current stagger by causing an app config update to be sent to a second engine within each container cluster of the current stagger, and receives an indication of success or failure of the attempted deployment of the feature release to the current stagger. Responsive to the indication of success or failure, the first engine performs one of a plurality of actions that include attempting to deploy the feature release to a next one of the staggers according to the order responsive to the indication indicating success, and causing a roll back of the current stagger responsive to the indication indicating failure.

20 Claims, 9 Drawing Sheets

(56) References Cited

U.S. PATENT DOCUMENTS

| | | | | |
|---|---|---|---|---|
| 11,669,510 | B2 | 6/2023 | Baker et al. | |
| 11,734,130 | B1 * | 8/2023 | Khanna | G06F 11/1469 714/4.11 |
| 11,755,400 | B2 | 9/2023 | Karani et al. | |
| 12,050,505 | B2 * | 7/2024 | Dande | G06F 11/0709 |
| 12,333,296 | B1 * | 6/2025 | Silakov | G06F 8/65 |
| 12,438,773 | B2 | 10/2025 | Karani et al. | |
| 2009/0144728 | A1 * | 6/2009 | Felts | G06F 8/60 717/175 |
| 2009/0183150 | A1 * | 7/2009 | Felts | G06F 8/71 717/173 |
| 2014/0053150 | A1 * | 2/2014 | Barnett | G06F 9/455 718/1 |
| 2014/0344810 | A1 * | 11/2014 | Wang | G06F 9/5072 718/1 |
| 2019/0130764 | A1 | 5/2019 | Karani | |
| 2019/0163664 | A1 | 5/2019 | Karani et al. | |
| 2020/0137159 | A1 | 4/2020 | Karani et al. | |
| 2020/0382365 | A1 | 12/2020 | Verma | |
| 2022/0012748 | A1 | 1/2022 | Karani et al. | |
| 2022/0050674 | A1 | 2/2022 | Liljeback et al. | |
| 2022/0206772 | A1 * | 6/2022 | Akiona | H04L 47/12 |
| 2023/0044016 | A1 * | 2/2023 | Harper | G06F 9/44505 |
| 2023/0065431 | A1 * | 3/2023 | Kumar | G06F 9/445 |
| 2023/0101551 | A1 | 3/2023 | Jobanputra et al. | |
| 2023/0168960 | A1 | 6/2023 | Karani et al. | |
| 2023/0315531 | A1 * | 10/2023 | Shen | G06F 9/455 718/104 |
| 2024/0020107 | A1 | 1/2024 | Beveridge et al. | |
| 2024/0134624 | A1 * | 4/2024 | Allen | H04L 45/563 |
| 2024/0143303 | A1 | 5/2024 | Kholodkov et al. | |
| 2024/0394035 | A1 | 11/2024 | Verma et al. | |
| 2024/0419511 | A1 * | 12/2024 | Tie | G06F 8/65 |
| 2025/0244993 | A1 | 7/2025 | Karani et al. | |
| 2025/0244994 | A1 | 7/2025 | Karani et al. | |
| 2025/0247292 | A1 | 7/2025 | Karani et al. | |

OTHER PUBLICATIONS

"Trusted Application Automated Deployment Solutions-Chef", article, 11 pages, Progress Chef, Burlington, MA, Retrieved from https://www.chef.io/solutions/application-deployment (Year: 2024).

Silva Jr, Jairo DA, "Automating deployment strategies with Ansible", article, Jan. 9, 2019, 9 pages, Opensource, Raleigh, NC, Retrieved from https://opensource.com/article/19/1/automating-deployment-strategies-ansible (Year: 2024).

Ran, Cohen, "Configuration-as-Code: Automating Application Configuration", article, Jun. 14, 2023, 10 pages, DEV Community, New York, NY, Retrieved from https://dev.to/rannn505/configuration-as-code-automating-application-configuration-45k6 (Year: 2024).

"Deployment automation: What is it and how to start", article, 11 pages, Atlassian, Sydney, Australia, Retrieved from https://www.atlassian.com/devops/frameworks/deployment-automation (Year: 2024).

"Puppet for Configuration Management Automation-Puppet", article, 9 pgs, Perforce, Minneapolis, MN. Retrieved from https://www.puppet.com/why-puppet/use-cases/continuous-configuration-automation (Year: 2024).

"NPL-Gater, Gater Overview", 3 pages.

Notice of Allowance, U.S. Appl. No. 18/429,381, Jun. 13, 2025, 11 pages.

Non-Final Office Action, U.S. Appl. No. 18/429,412, Dec. 17, 2025, 16 pages.

Non-Final Office Action, U.S. Appl. No. 18/429,415, Oct. 1, 2025, 14 pages.

* cited by examiner

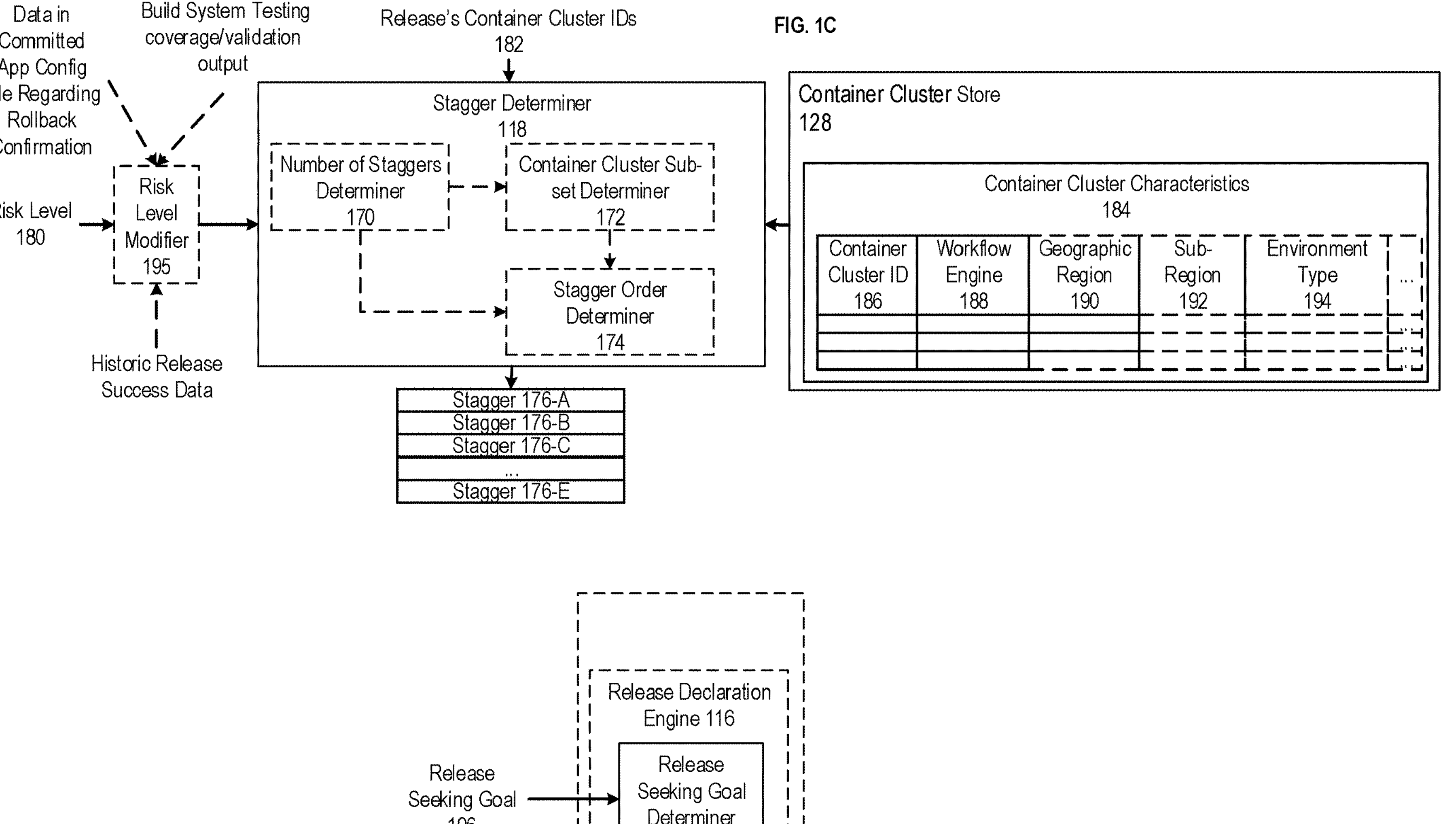
FIG. 1C
Data in Committed App Config File Regarding Rollback Confirmation
Build System Testing coverage/validation output
Risk Level 180
Risk Level Modifier 195
Historic Release Success Data
Release's Container Cluster IDs 182
Stagger Determiner 118
Number of Staggers Determiner 170
Container Cluster Sub-set Determiner 172
Stagger Order Determiner 174
Stagger 176-A
Stagger 176-B
Stagger 176-C
...
Stagger 176-E
Container Cluster Store 128
Container Cluster Characteristics 184
Container Cluster ID 186
Workflow Engine 188
Geographic Region 190
Sub-Region 192
Environment Type 194
...
Release Seeking Goal 196
FIG. 1D
Release Declaration Engine 116
Release Seeking Goal Determiner 198
Release Manager 110

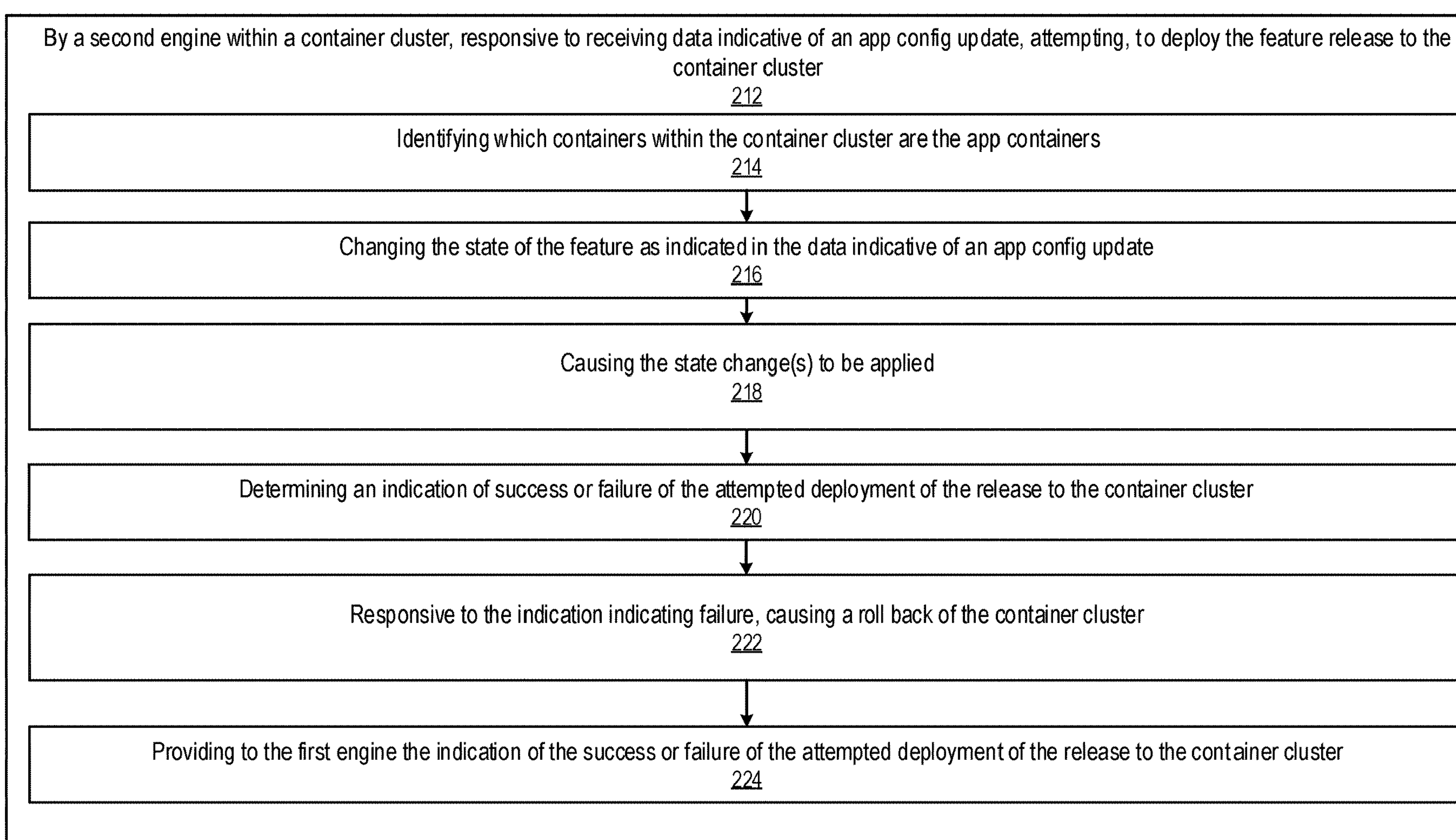
FIG. 2B
By a second engine within a container cluster, responsive to receiving data indicative of an app config update, attempting, to deploy the feature release to the container cluster
212
Identifying which containers within the container cluster are the app containers
214
Changing the state of the feature as indicated in the data indicative of an app config update
216
Causing the state change(s) to be applied
218
Determining an indication of success or failure of the attempted deployment of the release to the container cluster
220
Responsive to the indication indicating failure, causing a roll back of the container cluster
222
Providing to the first engine the indication of the success or failure of the attempted deployment of the release to the container cluster
224

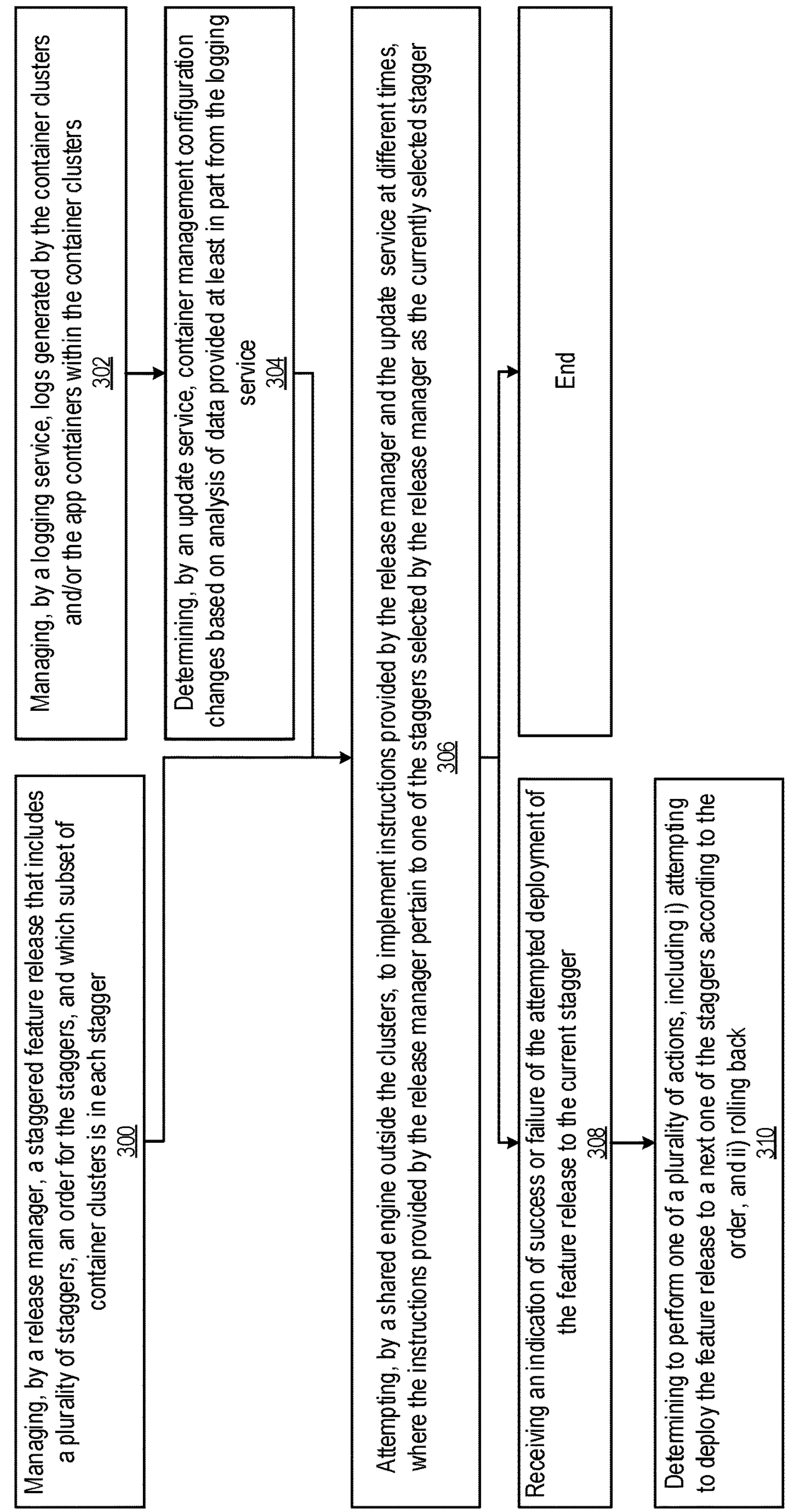
FIG. 3
Managing, by a release manager, a staggered feature release that includes a plurality of staggers, an order for the staggers, and which subset of container clusters is in each stagger
300
Managing, by a logging service, logs generated by the container clusters and/or the app containers within the container clusters
302
Determining, by an update service, container management configuration changes based on analysis of data provided at least in part from the logging service
304
Attempting, by a shared engine outside the clusters, to implement instructions provided by the release manager and the update service at different times, where the instructions provided by the release manager pertain to one of the staggers selected by the release manager as the currently selected stagger
306
Receiving an indication of success or failure of the attempted deployment of the feature release to the current stagger
308
End
Determining to perform one of a plurality of actions, including i) attempting to deploy the feature release to a next one of the staggers according to the order, and ii) rolling back
310

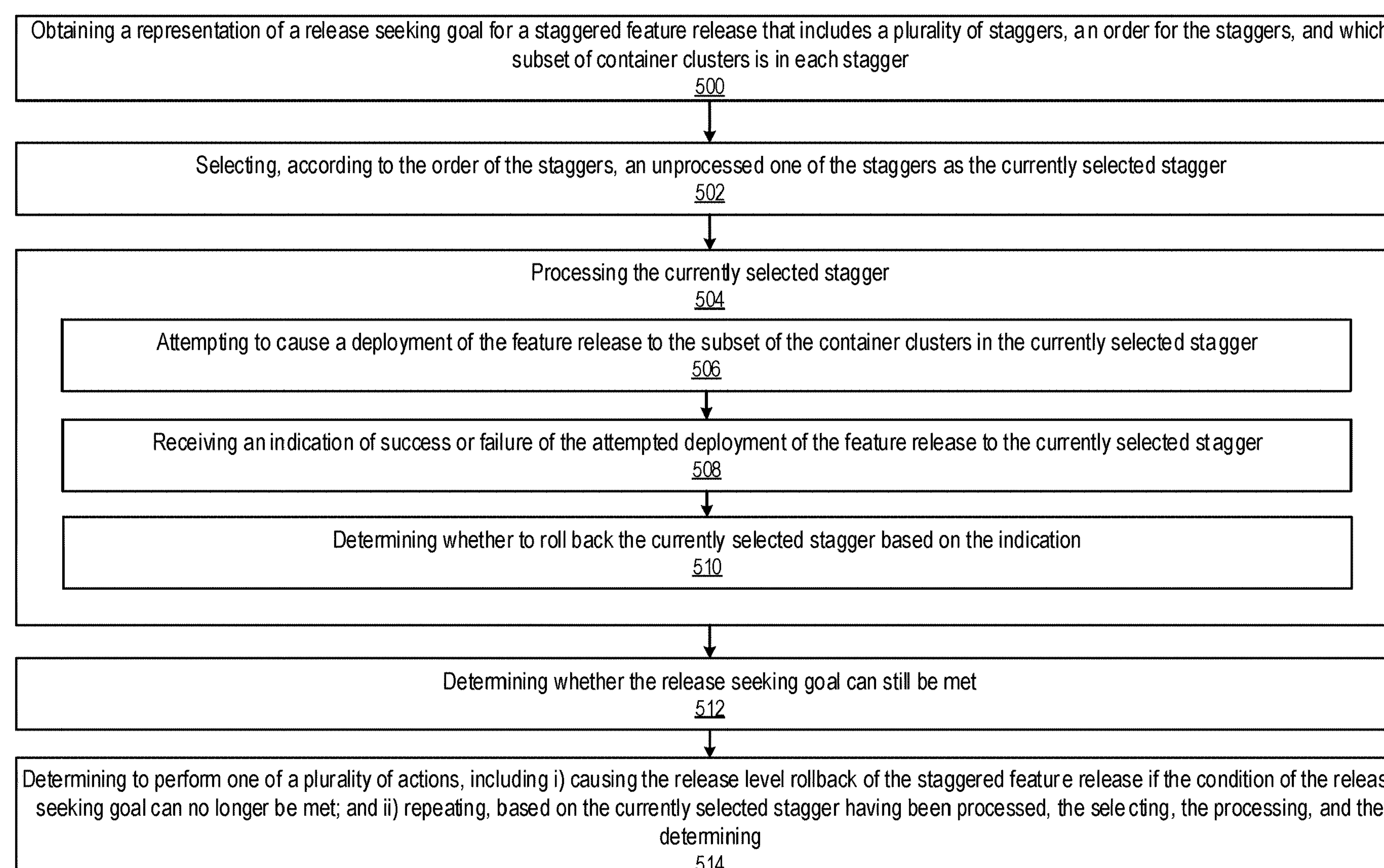
FIG. 5
Obtaining a representation of a release seeking goal for a staggered feature release that includes a plurality of staggers, an order for the staggers, and which subset of container clusters is in each stagger
500
Selecting, according to the order of the staggers, an unprocessed one of the staggers as the currently selected stagger
502
Processing the currently selected stagger
504
Attempting to cause a deployment of the feature release to the subset of the container clusters in the currently selected stagger
506
Receiving an indication of success or failure of the attempted deployment of the feature release to the currently selected stagger
508
Determining whether to roll back the currently selected stagger based on the indication
510
Determining whether the release seeking goal can still be met
512
Determining to perform one of a plurality of actions, including i) causing the release level rollback of the staggered feature release if the condition of the release seeking goal can no longer be met; and ii) repeating, based on the currently selected stagger having been processed, the selecting, the processing, and the determining
514

AUTONOMOUS CONFIGURATION-BASED RELEASE ORCHESTRATION

TECHNICAL FIELD

One or more implementations relate to the field of release orchestration; and more specifically, to container-orchestration system (COS) release orchestration.

DESCRIPTION OF THE RELATED ART

A container-orchestration system (COS) orchestrates deployment, scaling and management of containerized applications (also referred to as containerized software and containerized apps); in other words, it provides a platform for deployment, scaling, and operations of application containers within a container cluster. For example, Kubernetes® is a COS that works with a range of container tools, including those provided by Docker, Inc. Another example of a COS is Docker Swarm. A container is a self-contained execution environment, such as a Linux execution environment; in other words, a container is a standard unit of software that packages up code and all its dependencies, so that the application runs quickly and reliably regardless of its computing environment. A container image is used to create one or more containers at runtime. A container image is a lightweight, standalone, executable package of software that includes everything needed to run an application: code, runtime, system tools, system libraries and settings (e.g., a Docker container image becomes a Docker container when it is run on Docker Engine; another container engine is Rkt).

With regard to hardware, a COS may include: 1) nodes (also referred to herein as COS nodes), where a node is a representation of a single machine in a COS cluster, where that single machine can be a physical machine in a datacenter or virtual machine hosted on a cloud provider; 2) clusters (also referred to herein as COS clusters, Kubernetes clusters, service cluster, server instance), where a cluster represents a more powerful machine resulting from pooling the resources (processors and memory) of the nodes within the cluster; and 3) persistent volumes (a persistent volume is a file system that can be mounted to the cluster, without being associated with any particular node; while traditional local storage associated to each node is treated as a temporary cache to hold programs and data).

With regard to software, a COS may include: 1) containers (also referred to as COS containers, Docker containers, etc.); 2) pods (also referred to herein as "replicas," "COS pods," or "kpods" in a Kubernetes implementation), where a pod is the unit of replication and wraps one or more containers that will share the same resources and local network; 3) deployments, where a deployment manages a pod, including declaring the number of replicas of the pod and monitoring the pods; and 4) an ingress, where an ingress refers to a communication channel between a service running in a pod and the outside world, and is typically either an ingress controller, a load balancer, or Kube-proxy (a combination of a network proxy and a load balancer). In addition, a COS has support for an abstraction (e.g., a Kubernetes Service) that defines a logical set of pods and a policy by which to access them (sometimes called a microservice), as well as an API (e.g., Kubernetes Endpoints API) so that the service provided by one such abstraction can call the service provided by another such abstraction.

In operation, a COS cluster of nodes is formed and a set of one or more persistent volumes is attached to that cluster. Then, a COS deployment is launched onto the cluster. The COS deployment causes the spinning up and monitoring of the declared number of COS pods. Spinning up a COS pod includes executing the containerized application(s) specified in the container image(s) identified for that COS pod.

The combination of containers running within a COS cluster and the COS cluster itself are referred to here as a "container cluster."

A COS typically includes a COS engine (sometimes referred to as a COS controller) to control operation of the COS. A COS controller can receive an operation according to configuration information (sometimes referred to as a manifest, an "API object description," or "application configuration information") that describes the desired state of an application in terms of COS constructs.

Release management is the process by which software applications and updates are planned and deployed through a tiered series of environments, from development, through test and staging to production. Artifact-based release orchestration is the ability to coordinate automated tasks performed by multiple systems in order to deliver software updates to users. Artifact-based release orchestration involves spinning up new containers that contain the updated code, gradually shifting traffic from the old containers to the new containers, and gracefully shutting down the old containers. Autonomous artifact-based release orchestration involves deploying, monitoring, validating and, if necessary, rolling back updates to containerized apps, and doing so with minimal human intervention and minimal disruption to users.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 1C is a block diagram illustrating a stagger determiner according to some example implementations.

FIG. 1D is a block diagram illustrating release seeking goal determiner according to some example implementations.

FIG. 2B is a flow diagram showing operations of a second engine in response to receiving the data indicative of the app config update that was sent by the first engine (block 206).

FIG. 3 is a flow diagram illustrating a method for both autonomous container management configuration changes to container clusters during runtime and autonomous configuration-based release orchestration.

FIG. 5 is a flow diagram illustrating a method for autonomous configuration-based release orchestration according to some other example implementations.

DETAILED DESCRIPTION

Figure 1A:
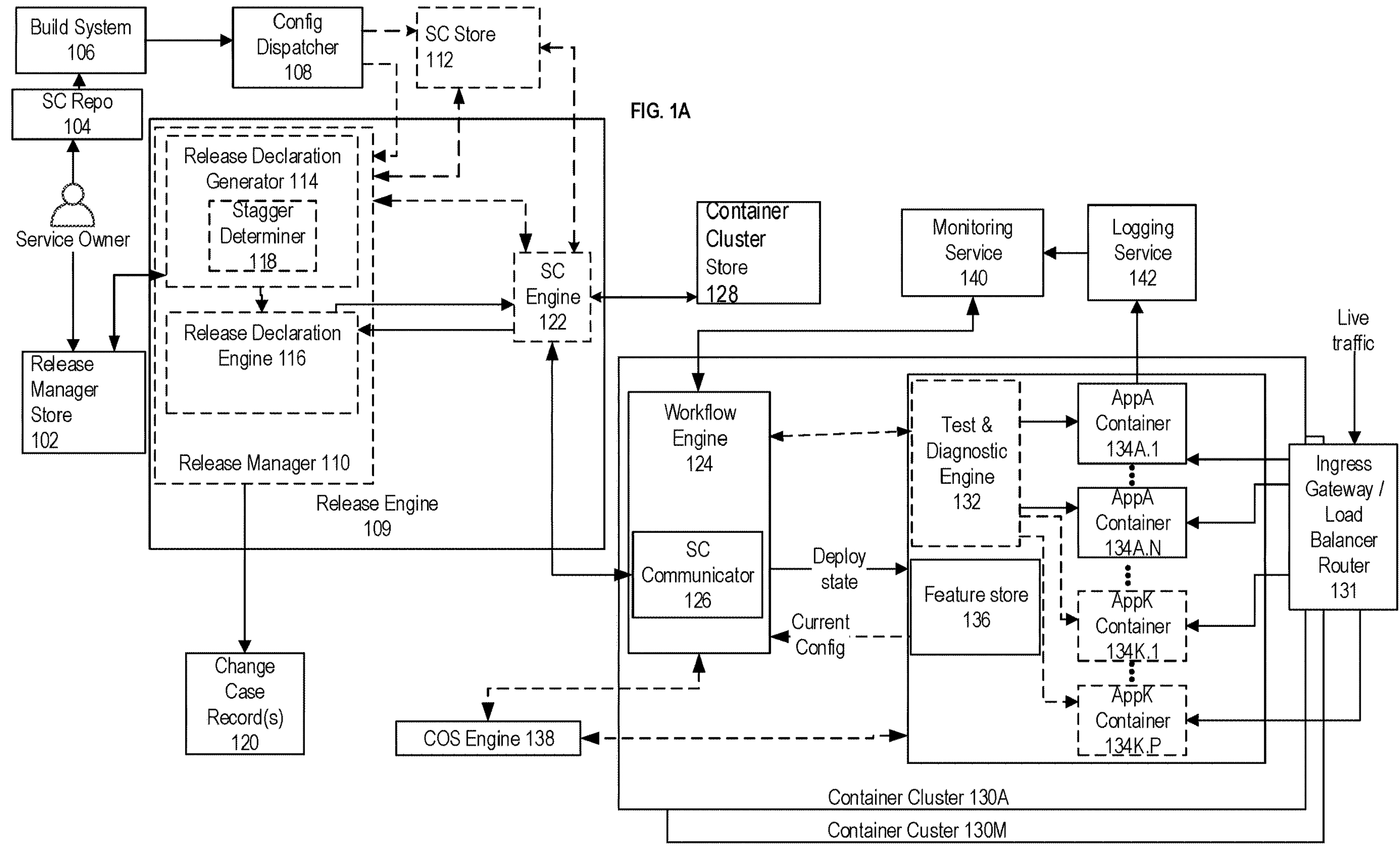
FIG. 1A is a block diagram illustrating an autonomous configuration-based release orchestration system according to some example implementations.

According to a first aspect, implementations described herein relate to autonomous configuration-based release orchestration that supports staggered feature release in a container orchestration system (COS). A configuration-based release (also called a feature-based release or config-based release) is different from an artifact-based release. In a feature-based release, an application has already been deployed into a container, and that application has a number of features already present in the code. However, the features each have a state that may be changed (e.g., between enabled and disabled, to different configuration values, to update a list of other features and their respective states, etc.). The state is controlled by data in a feature store (e.g., which features are enabled or disabled is often controlled by a set of flags (sometimes referred to as feature enablement flags)) within the COS. In a feature-based release, rather than replacing the code of the application, the release changes one or more of the states that control the features. The applicability of a change to a feature's state may apply to only a subset of traffic, such as traffic pertaining to a specific entity, container, application, etc. Staggered feature-based release describes a feature-based release methodology in which the state of one or more features of instances of containerized apps are changed, and the changes to the state of the features are applied to the containerized apps in stages or "staggers", where each stagger is made up of a distinct subset of one or more container clusters (e.g. Kubernetes® clusters—also called server instances or compute instances) that run the containerized app. The feature-based release is first attempted to be deployed to one of the staggers, and a determination is made whether the attempt was successful. If not successful, the feature-based release is rolled back either for specific container clusters in the stagger ("container cluster rollback"), or for the entire stagger ("stagger rollback"). Depending on the implementation and/or configuration, such a roll back of a stagger may terminate the entire feature-based release, pause the feature-based release, or the feature-based release may continue on to the next stagger. If the feature-based release continues to the next stagger (e.g., the feature based-release was successful on the first stagger or the implementation/configuration causes the system to continue to the next stagger), the feature-based release is deployed to the next stagger, and so on until deployment has been deployed to all staggers, stopped for some reason, or the entire feature-based release is rolled back ("release rollback") for some reason. Regardless of the type of roll back (e.g., container cluster rollback, stagger rollback, or release rollback), rolling back in the context of a feature-based release involves causing the state of the features, within the relevant container clusters (e.g., the container cluster for a container cluster rollback, the container cluster(s) in the current stagger for a stagger rollback, or all the container clusters involved in the release for a release rollback) to be in the state they were in prior to the attempted deployment of the feature-based release. This will involve changing back the state of features in any of the container clusters that were already changed as part of the attempted feature-based release.

According to a second aspect, implementations described herein relate to autonomous deployment of container management configuration changes to container clusters during runtime. While this second aspect can and will be described with reference to the first aspect, this second aspect may be used with other implementations and it is therefore independent of the first aspect.

According to a third aspect, implementations described herein use a risk based approach to dynamically determine a stagger configuration (e.g., the number of staggers, the make-up of each stagger (i.e. the particular subsets of one or more container clusters included in each one of the staggers), an ordering for the staggers, etc.) or a set of one or more stagger criteria (e.g., a risk level to use for the stagger determination) to use for generating a stagger configuration. While this third aspect can and will be described with reference to the first aspect, this third aspect may be used with other implementations and it is therefore independent of the first aspect.

According to a fourth aspect, implementations described herein use a configurable release seeking goal to determine whether a release should be rolled back. So long as the release seeking goal is being met, the release is not rolled back. Otherwise, if the release seeking goal is not met, or cannot be met, the release is rolled back. While this fourth aspect can and will be described with reference to the first aspect, this fourth aspect may be used with other implementations and it is therefore independent of the first aspect.

While all of the above aspects may be combined in a single implementation, other implementations may implement less than all of the aspects (e.g., just one of the aspects; just the first and second aspects; just the first, second, and third aspects; just the first and third aspects; just the first, third, and fourth aspects; just the third and fourth aspects; etc.).

Overview

The discussion below refers to various sources (e.g., a release declaration template, change case record template, and application config file). In some implementations, one or more of these sources include data that represents release customizations. Different implementations support different release customizations and/or source(s) of the release customizations to use for a specific release. For example, the release customizations may include one or more of a release-level goal, an app refresh type, a stagger-level threshold, a selection of a change case record template, a set of one or more stagger criteria to use for generating a stagger configuration, part or all of the stagger configuration, etc. These release customizations are described in more detail below.

While the release customizations to use for a specific release may all be sourced from the same place, some implementations source one or more from different places (e.g., a release declaration template, change case record template, and application config file). Further, the design choices for release customization sources may be determined based upon various factors, such as: 1) the expected frequency with which a service owner may wish to change a given one of the release customizations (e.g., the release-level goal may be expected to be adjusted more often than the stagger level threshold); 2) the likelihood that a given release customization will be chosen by a number of different service owners (e.g., multiple services owners may wish to use the same change case record template); and/or 3) the relationship of one release customization to another release customization (e.g., the selection of the change case record template and the risk level to use for stagger determination may be related). By way of more specific examples, in some implementations that support all of the above release customizations, the release customization sources may be designed as follows: 1) the source of the release-level goal and app refresh type is chosen such that it may be easily changed on a per release basis; 2) the source of the app refresh type is chosen such that it may be easily changed on a per-feature basis; 3) the source of the app refresh type, the stagger level threshold, and the change case record template is chosen such that it may be easily be changed on a per application basis; and 4) the risk level to use for the stagger determination is tied to the selection of the change case record template (where the system automatically determines the selection of the number of staggers and which container clusters to include in which staggers). In other implementations that support all of the above release customizations, the source for all are chosen to easily allow changing them on one of a per release basis or per application basis. By way of specific example, one implementation may support the stagger criteria being sourced to easily allow for changing it on a per-release basis (e.g., a selection of a number of staggers and a selection of which container clusters to include in which staggers).

The sources described above could be implemented using one or more files or objects that contain data and/or metadata representing release customizations, typically in key-value pair format. Some of these sources may be provided to the system in advance while others may be generated by the system based on other inputs. Electronic data interchange (EDI) files including JavaScript Object Notation (JSON) files and Extensible Markup Language (XML) files are examples of human readable and parscable source files. The Kubernetes® ConfigMap object is an example of a source object.

In addition to the stagger configuration and set of one or more stagger criteria that were discussed above, some of the other possible release customizations will now be described in more detail, though it should be understood that this list is not exhaustive and other release customizations are also possible.

A first release customization may specify a release-level goal, which is a condition that must evaluate to "true" in order for the release to be considered a success (and therefore not rolled back). Release-level goals are discussed in more detail below.

A second release customization may specify a set of one or more app refresh types. An app refresh type specifics how an app instance is to be refreshed (e.g. signaling, restart, etc.) in order for the app to begin using the updated feature states. In some cases the app refresh type can be set per app, in which case the app is refreshed the same way (e.g. signaling, restart, etc.) regardless of the features whose state is being changed in that release. In other cases, an app refresh type can be set per feature, in which case the way in which the app is refreshed depends on the features whose states are updated and the app refresh types associated with those features.

A third release customization may specify a stagger-level threshold, which represents a condition that must evaluate to "true" in order to prevent a stagger rollback. The stagger-level threshold is discussed in more detail below.

A fourth release customization may specify a selection of a change case record template. The selection identifies a stored change case record template (e.g. an event log template) that is to be used by the system to generate a change case record (e.g. an event log) in which events pertaining to the attempted release deployment are recorded (e.g. for audit and compliance purposes). In some cases, the change case record template also identifies one or more logging parameters to use when generating the logs, e.g. the types of events that are to be recorded, when they are to be recorded, the level of detail to be recorded, etc.

A fifth release customization may specify a set of one or more communication mechanisms to be used by one or more of the services in the COS to post and retrieve messages (e.g. cluster-level validation indicators, as discussed below) regarding the release deployment, including, e.g. whether an app, container, or container cluster is functioning properly, as will be discussed below. For example, in one such implementation, one communication mechanism is a set of one or more webhooks (also called "notification URLs").

FIG. 1A

FIG. 1A is a block diagram illustrating an autonomous configuration-based release orchestration system according to some example implementations.

FIG. 1A shows a set of one or more container clusters 130A-130M (collectively referred to as container clusters 130), each with a COS engine 138. The container cluster 130A is running multiple containers 134. At least some of the containers 134 run instances of a containerized app "App A" in containers 134A.1-134A.N. The container cluster 130A may optionally run other apps in others of the containers 134 as represented by ellipses and instances of containerized app "App K" in containers 134K.1-134K.P. Others of the container clusters 130 may also run one or more instances of containerized app "App A", as well as optionally other containerized apps in separate containers.

Ingress Gateway/Load Balancer 131 routes live traffic between electronic devices outside of the container cluster 130A and different ones the containers 134. In this example, assume that the current version of App A was deployed with code to support a number of features, and at least some of these features have changeable states (e.g. by changing the state for those features between enabled and disabled) for the traffic processed by an instance of App A (e.g. based on the origin or type of traffic). App A determines the state to use for the features (e.g., which features are to be enabled or disabled) by accessing a feature store 136 (e.g., a config map, a file, a database) stored within the container cluster that identifies a plurality of features and their respective states. The identified state controls/configures these features of App A (e.g., whether a given feature is to be in an enabled state or a disabled state in respect of incoming traffic to App A). For example, in some implementations, changes to feature states may only be applied to traffic from specific entities (e.g. users that pay for the specific features). Changes to the feature states for instances of App A are made by updating (e.g., replacing or altering) the part of the feature store associated with App A with new feature states and refreshing instances of App A (e.g. by signaling the app or restarting the app). Also included in the container cluster is a workflow engine 124 that is responsible for updating the feature store when app feature states are to be changed (e.g., enabled or disabled).

Each of container clusters 130A-130M optionally includes a respective test and diagnostic engine 132 associated with the respective container cluster. The test and diagnostic engine 132 tests the health of the containers in the associated container cluster, and reports to workflow engine 124 on the health of the containers.

Prior to an upcoming release that updates the feature store 136 associated with an app, a service owner of the app (e.g. a person authorized to make software changes to the app) causes a release declaration template to be stored in a release manager store 102 (e.g., a file, a database, etc.). The release declaration template is one of the sources described above and is a templated version of a release declaration. The release declaration is generated by the system and contains information (including data and metadata) used by the system to manage aspects of the release deployment, including how the release is to be rolled out, tested and validated. In some implementations, each app that is to be managed by the configuration-based release orchestration system is associated with one release declaration template, although a single release declaration template can be used for multiple apps. In some implementations, the release declaration template differs from the release declaration in that the release declaration template serves as the basis for generating the release declaration and includes one or more values indicative of release customization(s). Depending on the implementation, at least some of these values may be input by a human thereby indicating a desire to use those specific values for the upcoming release instead of having the values automatically generated by the system. In other cases, the release declaration template may contain a set of one or more default values that could be overridden by the system. In some implementations, the release declaration template includes one or more values indicative of a stagger-level threshold(s), and change case template identifier. The change case template is another one of the sources described above and, in some implementations, the change case template identified by the change case template identifier includes a value indicative of a risk level associated with the release.

Next, the service owner initiates the autonomous release orchestration by committing changes to an application config file stored in an application structured config (SC) repository (e.g., GitHub), shown in FIG. 1A as the SC Repo 104. The application config file is another one of the sources described above. In some implementations, the application config file indicates, in key-value pair format, a plurality of features and their respective states. In some situations, these states may reflect a set of one or more not yet enabled features that are to be enabled in the upcoming release. The application config file can also include the container clusters that are to be updated with the new feature states. For example, if the container clusters correspond to data centers, the service owner can specify in the application config file which container clusters 130 (which may be in different data centers) are to be updated with the new states (e.g. by specifying one or more identifiers corresponding to different data centers or container clusters). In some implementations, the application config file includes one or more values indicative of release customization(s). In some implementations, the application config file includes one or more values indicative of a release seeking goal, app refresh type(s), and webhook(s) (or other communication mechanism described above). In some implementations, the service owner commits the config file by saving the config file in a specified build folder associated with a particular app. In this case, the build folders are automatically and periodically scanned by a continuous integration/continuous deployment (CI/CD) system (shown in FIG. 1A as build system 106).

Build system 106 scans SC Repo 104 for changes, "picks up" the committed application config file, scans the files or objects to understand what changes have been made relative to existing application files or objects, validates the changes, and generates a config-based release artifact based on the changes. Validating the changes includes, for example, ensuring that any new values defined for key-value pairs are within predefined ranges that were configured in advance (e.g. by the service owner). Build system 106 then provides the config-based release artifact to config dispatcher 108. Config dispatcher 108 then provides the config-based release artifact to release engine 109.

Release engine 109 obtains the config-based release artifact, obtains the release declaration template from release manager store 102, generates the release declaration (which includes a stagger configuration). The release engine 109 then attempts to deploy the feature release to the current stagger by causing data indicative of an app config update to be sent to the workflow engines 124 in the container clusters 130 of the current stagger. The data indicative of an app config update includes an indication of which of the features of the application are to be changed to which state. The release engine 109 receives an indication of success or failure of the attempted deployment of the feature release to the current stagger. Responsive to the indication of success or failure, release engine 109 performs one of a plurality of actions, including, e.g. i) attempting to deploy the feature release to a next one of the plurality of staggers according to the order responsive to the indication indicating success, and ii) causing a roll back of the current stagger responsive to the indication indicating failure, where the roll back causes the states of any features that were changed as a result of the attempted deployment to be returned to the states those features were in prior to the attempted deployment.

In some implementations, the operations of the release engine 109 are divided into a release manager 110 and a SC engine 122. This separation can be advantageous in implementations like that shown in FIG. 1B (described in more detail later herein) because operations specific to release management and the update service are respectively separated into the release manager 110 and update service 144, while operations either or both may make use of are implemented by the SC engine 122. While the following description of FIG. 1A contemplates release engine 109 divided into release manager 110 and SC engine 122, it should be understood that this is a design choice. Thus, alternative implementations may make different design choices (e.g., merge release manager 110 and update service 144 together as illustrated by release engine 109; merge SC engine 122 with release declaration engine 116, and implement release declaration generator 114 separately; etc.).

While in some implementations the config dispatcher 108 provides the config-based release artifact to release manager 110 directly, other implementations may use other approaches (e.g., config dispatcher 108 stores the config-based release artifact in SC store 112 (e.g., a file, a database, etc.) where it is then retrieved by release manager 110; config dispatcher 108 stores the config-based release artifact in SC store 112 and the, release manager 110 requests the config-based release artifact from SC engine 122, which retrieves the config-based release artifact from SC store 112 and provides it to release manager 110; etc.).

Release manager 110 manages the deployment of the feature-based release. First, release manager 110 obtains the config-based release artifact, obtains the release declaration template from release manager store 102, and generates, using release declaration generator 114, the release declaration. Included in the release declaration is stagger configuration data that reflects a particular stagger configuration, including, e.g., the number of staggers to use in the release, the make-up of each stagger (i.e. the particular subsets of one or more container clusters included in each one of the staggers), an ordering for the staggers, and any other data pertaining to the staggering. In some cases, information regarding a desired stagger configuration may be obtained from one of the sources discussed above (e.g. the release declaration template, application config file, etc.). In other cases, release manager 110 may dynamically generate part or all of the stagger configuration based on the set of one or more stagger criteria obtained from one of the sources. The latter implementation is discussed in more detail below.

Next, responsive to the release declaration, the release declaration engine 116 in the release manager 110 starts processing the staggers, one stagger at a time, in order beginning with the first stagger. A stagger currently being processed is referred to herein as the "current" stagger. Once the current stagger processing is finished and if the release declaration engine 116 in the release manager 110 determined the next stagger should be processed, the next stagger to be processed becomes the "new" current stagger. Release manager 110 processes the current stagger by: i) sending to SC engine 122 data indicative of the current stagger (which includes at least identifiers of the subset of one or more container clusters 130A-130M in the current stagger, and optionally a stagger-level threshold associated with the current stagger), and ii) receiving from SC engine 122 data indicative of whether the feature-based release was successfully deployed to the current stagger. Based on the data indicative of whether the release was successfully deployed to the current stagger that is received from SC engine 122, release manager 110 determines a next action, including, e.g. whether to move on to the next stagger, stop, or perform a rollback (e.g. a stagger rollback and/or release rollback). In some implementations as will be described below, determining whether to move on to the next stagger, stop, or perform a rollback may include determining whether a release-level goal can still be met.

In some implementations, the release manager 110, as part of processing the current stagger also creates a change case record 120 to record details of the current stagger. Release manager 110 causes a change case record 120 to be generated. The change case record 120 that is generated is based on the change case template identified by the change case template identifier in the release declaration. In some implementations, the release manager 110, as part of processing the current stagger, also: a) acquires locks on the container clusters in the current stagger before sending to SC engine 122 data indicative of the current stagger, and b) releases the locks on the container clusters in the current stagger responsive to receiving the data indicative of whether the feature-based release was successfully deployed to the current stagger.

In addition to sending SC engine 122 data indicative of the current stagger, release manager 110 also sends to SC engine 122 data indicative of an app config update. The data indicative of an app config update is hereinafter referred to simply as an "app config update". The app config update can be sent once (e.g. with the initial stagger) or with each stagger. The app config update includes one or more updated states associated with a respective one or more features, and an identifier or other indication of the app to "update" (i.e. by replacing one or more existing feature states with the one or more updated states). Depending on implementation and the particular release customization(s) chosen for the feature-based release, the app config update can include one or more app refresh types and/or one or more webhooks.

As discussed above, based on the data indicative of whether the feature-based release was successfully deployed to the current stagger that is received from SC engine 122, release manager 110 determines a next action. For example, if the data received from SC engine 122 indicates that the feature-based release deployed successfully to the current stagger, and there are more staggers left to process, the next stagger becomes the new current stagger, and release manager 110 processes the new current stagger in the same manner as described above. Otherwise, if there are no more staggers to process, the feature-based release deployment is completed. On the other hand, if the data received from SC engine 122 indicates that the feature-based release was not deployed successfully to the current stagger, release manager 110 may determine to perform: 1) a release rollback that includes the current stagger (assuming the SC engine 122 did not already rollback the current stagger); 2) a stagger rollback (assuming the SC engine 122 did not already rollback the current stagger) and a release rollback that does not include the current stagger; 3) a stagger rollback (assuming the SC engine 122 did not already rollback the current stagger) but not a release rollback (e.g. and continue with the next stagger), or stop (assuming the SC engine 122 already rolled back the current stagger).

SC engine 122 receives the data indicative of the current stagger and the app config update from release manager 110 and processes the current stagger by i) identifying the respective workflow engines 124 responsible for each one of the subsets of one or more of the container clusters 130A-130M in the current stagger, ii) sending each identified workflow engine 124 the app config update, iii) determining whether the feature-based release was deployed successfully to the current stagger (which as will be described below may include determining whether a stagger-level threshold associated with the current stagger is met), and iv) sending to release manager 110 data indicative of the whether the feature-based release was deployed successfully to the current stagger.

In some implementations, SC engine 122 may identify (including potentially how to communicate with) a workflow engine 124 associated with a particular container cluster by looking up the container cluster in a container cluster store 128 (e.g., a file, a database, etc.) (e.g. using a container cluster identifier provided by release manager 110) to identify the workflow engine 124 associated with the container cluster.

In some implementations, in determining whether the feature-based release was deployed successfully to the current stagger, SC engine 122 may retrieve messages ("cluster-level validation indicators") posted to one or more webhooks in order to determine whether the containers are operating as expected. In other implementations, the workflow engines may report to SC engine 122 whether the containers are operating as expected using a different communication mechanism as described above.

In some implementations, if SC engine 122 determines that the feature-based release was not deployed successfully to the current stagger, SC engine 122 may also perform a stagger rollback (e.g. without input from release manager 110).

Each workflow engine 124 associated with a container cluster receives from SC engine 122 via SC communicator 126 the app config update. Workflow engine 124 determines which containers have instances of the app (using the identifier of the app received from SC engine 122). In some implementations, each workflow engine 124 makes a copy of the existing feature state associated with the app ("App A" in the example shown in FIG. 1A) in case a rollback is required, and updates (e.g. replaces or alters) the existing feature state associated with the app to reflect the new feature state. In some implementations, the feature states associated with an app instance may be stored in a feature store 136 (e.g. a ConfigMap object in Kubernetes®, a file on the volume, etc.), in which case workflow engine 124 may replace the stored states with the new states. In some implementations, prior to deploying the updated feature states, workflow engine 124 may compare the existing feature states with the updated feature states to confirm they are different.

As discussed above, some implementations include, in the app config update, a set of one or more app refresh types. In this case, after updating (e.g. replacing or altering) the existing feature states associated with the app to reflect the new feature states, workflow engine 124 causes the app instances to be refreshed by signaling the COS engine 138 associated with the container cluster to refresh the app instances using the set of one or more app refresh types received from SC engine 122 (e.g. restart or signaling). In some cases, as described above, there may be a single app refresh type associated with the app, in which case COS engine 138 applies the app refresh type to each app instance. In other cases, as described above, there may by a different app refresh type associated with each of the one or more features whose states are to be changed (e.g., enabled), in which case COS engine 138 determines, based on the new feature states, how the app instances are to be refreshed.

Each workflow engine 124 then: 1) validates the associated container cluster (determines whether the containers with the app affected by the change in feature states are operating as expected) and 2) communicates the status to SC engine 122.

Implementations may use one or more different methods of validation depending on implementation. For example, in implementations that support container clusters 130A-130M each including the optional test and diagnostic engine 132, workflow engine 124 can trigger the test and diagnostic engine 132 to validate and report to workflow engine 124 on the health of the containers and/or app instances.

Additionally or alternatively, the system may include a logging service 142 and a monitoring service 140. The logging service 142 and monitoring service 140 can be external to the container clusters. Each container cluster 130 and/or each instance of app A may generate logs. Different ones of the container clusters can be hosted in different datacenters (e.g., first party datacenters and/or third-party datacenters). Logging service 142 aggregates the logs (converting formats if and as needed) and sends the result to monitoring service 140. Monitoring service 140 parses and analyzes the aggregated log in order to determine the health of the containers and/or app A instances in the cluster, and reports to workflow engine 124.

Implementations may use one or more different mechanisms for the workflow engine 124 to communicate the validation status to SC engine 122. For instance, as previously described, implementations may have the workflow engine 124 communicate the validation status to the SC engine 122 by posting cluster-level validation indicators to the webhook provided by SC engine 122, and SC engine 122 can check each of the webhooks associated with respective container clusters to determine the validation status of the container clusters with app instances whose feature states were updated. Other implementations may support use of additional or alternative mechanisms (e.g., each workflow engine 124 may update SC engine 122 directly (e.g. via SC communicator 126)).

In some implementations, workflow engine 124 may also perform a container cluster rollback if the validation failed (e.g. the containers with the app affected by the change in feature states are not operating as expected or there is a performance degradation because of the changes in feature states).

As detailed above, in some implementations release manager 110 sends SC engine 122 a stagger-level threshold associated with the current stagger. In these implementations, SC engine 122 determines, based on the validation statuses reported by the workflow engines 124 for the container clusters in the stagger, whether the stagger-level threshold is met. While in some implementations different staggers may be associated with different stagger-level thresholds (e.g., a first stagger may be associated with a first threshold, while a second stagger may be associated with a second threshold that is more or less than the first threshold, etc.), in other implementations the stagger-level threshold is set on a per-release (e.g., through entry into the SC Repo 104) or per app basis (e.g., through inclusion in the release declaration template).

If SC engine 122 determines that the stagger-level threshold is met, SC engine 122 sends release manager 110 data indicating that the feature-based release was successfully deployed to the current stagger. On the other hand, if SC engine 122 determines that the stagger-level threshold is not met, SC engine 122 sends release manager 110 data indicating that the feature-based release was not successfully deployed to the current stagger. For example, if the stagger-level threshold indicates that all container clusters in the stagger must be in a "healthy" state (e.g. by operating as expected), then a failure of any container cluster to be in a healthy state causes the stagger-level threshold to not be met. On the other hand, the stagger-level threshold may instead indicate that less than all container clusters (e.g. 50%, 80%, one container cluster, etc.) need to be in a healthy state for the release deployment to the stagger to be considered successful. In such cases, SC engine 122 determines, based on all the received validation statuses, whether the requisite number of container clusters are in a healthy state to meet the stagger-level threshold.

While implementations described above include release manager 110 rolling back the current stagger if the feature-based release was not successfully deployed to the current stagger, implementations may alternatively or additionally support the SC engine 122 rolling back the current stagger without input from release manager 110 (e.g. by communicating to each respective workflow to redeploy the existing (i.e. prior to the feature-based release) feature states and refresh the app instances.) Each of the workflow engines 124 then updates (e.g. replaces or alters) the feature states associated with the app to reflect the feature states that were in use prior to the feature-based release.

The process described above continues until all staggers have been processed, or release manager 110 determines to stop (and possibly perform a stagger rollback and/or release rollback) as described above.

FIG. 1B

Figure 1B:
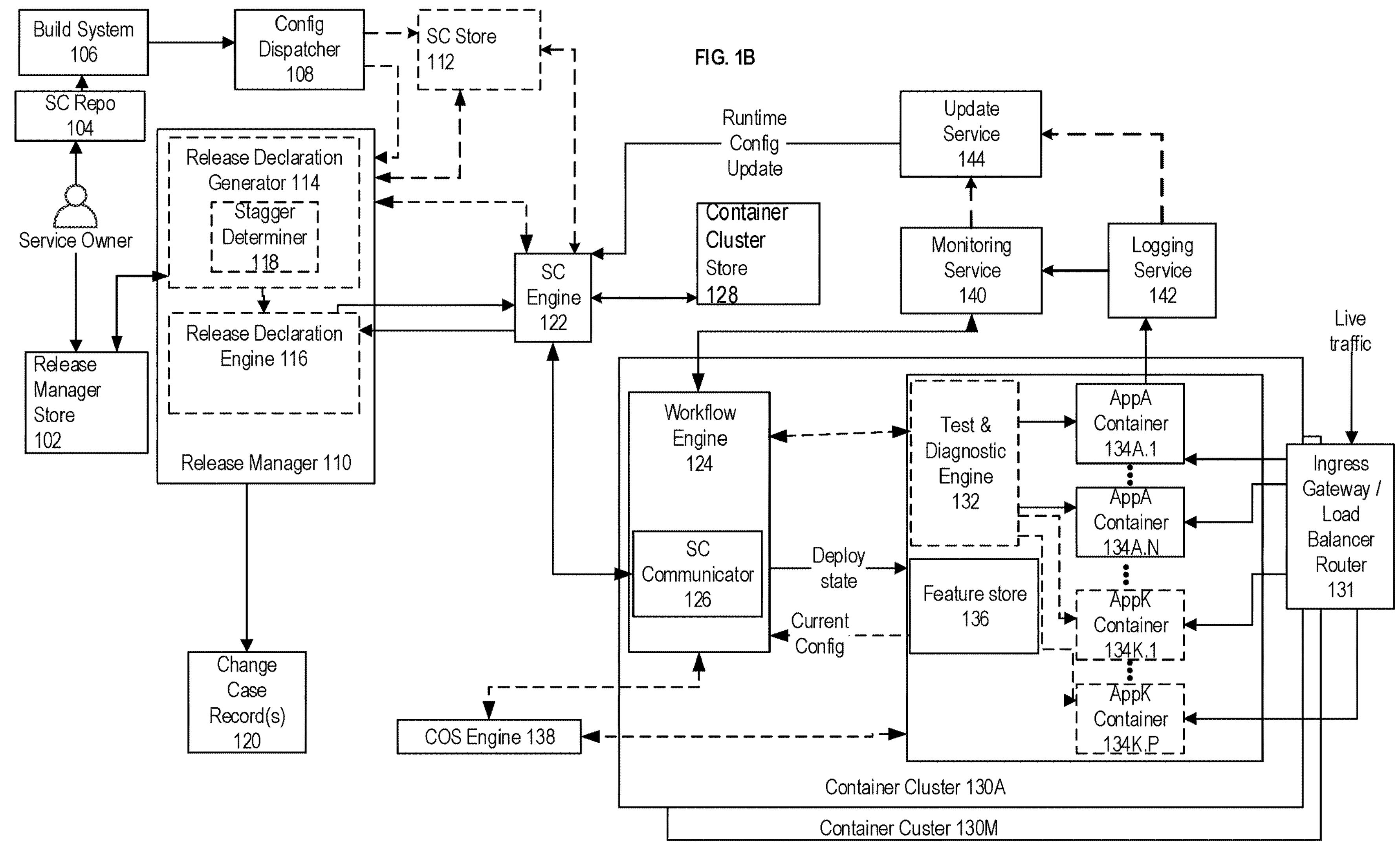
FIG. 1B is a block diagram illustrating an autonomous configuration-based release orchestration system that includes autonomous container management configuration changes to container clusters during runtime according to some example implementations.

Another aspect of the present disclosure relates to autonomous container management configuration changes to container clusters during runtime. FIG. 1B is a block diagram illustrating an autonomous configuration-based release orchestration system that includes autonomous container management configuration changes to container clusters during runtime according to some example implementations.

FIG. 1B is similar to FIG. 1A but now includes an update service 144 coupled to the logging service 142 and/or to the monitoring service 140. Update service 144 receives status information regarding the current status of the container clusters 130, and may additionally receive one or more other inputs such as configuration data and/or historical data pertaining to the container clusters (e.g. the types and/or volumes of traffic received at the container clusters, app containers, and/or instances of the application at different times in the past, etc.). While in some implementations update service 144 receives this status information in the aggregated (and formatted, if necessary) log data from logging service 142, in other implementations update service 144 additionally or alternatively receives the status information from another source (e.g., update service 144 may receive and analyze some result of analysis performed on the log data by monitoring service 140; update service 144 may receive and analyze both some analysis results from monitoring service 140 and some or all of the log data provided by monitoring service 140 or logging service 142; etc.).

In some implementations the status information (e.g., log data and/or analysis results from monitoring service 140) provided to update service 144 may include, e.g., one or more of: 1) volume of traffic being received by the app containers (or a subset of the app containers with instances of a particular application (e.g., App A)) currently running in each of the container clusters; 2) CPU and/or storage usage by the app containers (or a subset of the app containers with instances of a particular application (e.g., App A)); 3) CPU load and/or storage of electronic devices running the app containers, health of the app containers (or a subset of the app containers with instances of a particular application (e.g., App A)), etc.

The update service 144 analyzes the status information, as well as any additional inputs such as configuration data and/or historical data, to determine any container management configuration changes, which in some implementations include identifying the specific container clusters or subsets thereof to receive the configuration changes). The analysis performed by update service 144 may differ by implementation, application, and/or the information (current status information, configuration data, and/or historical data) provided to update service 144. As a first example, the analysis may be based on just the current status information (e.g., reactive, such as exceeding available resources; proactive, such as getting close to exceeding available resources; etc.). As a second example, the analysis may be based on just configuration data provided by the service owner of the application (e.g., dates and/or times on which changes are to be made). As a third example, the analysis may be based on comparing the status information to configuration data (e.g., threshold(s) for triggering container management configuration changes) provided by the service owner of the application (e.g., threshold volume(s) of traffic, etc.). As a fourth example, the analysis may be based on the current status information and historical data, which may be used to predict changes that may be needed before they are needed (e.g., predictions of changes in the volume of traffic, etc.). As a fifth example, the analysis may be based on: 1) combining the current status information and predictions based on historical data; and 2) comparing the result of the combining against service owner provided configuration data (e.g., threshold(s)). In some implementations, one or more machine learning techniques and/or algorithms may be used to analyze the current status information and/or historical data and recommend configuration changes (e.g. Multi-Scale Convolutional Recurrent Encoder-Decoder (MSCRED) for anomaly detection and diagnosis in multivariate time series data, etc.).

The container management configuration changes that update service 144 may make pertain to runtime configuration of the container clusters. The runtime configuration changes may include, e.g. 1) adding app containers for a particular application (e.g., App A) to one or more of the container clusters; 2) removing app containers for a particular application from one or more of the container clusters; 3) changing the allocation (e.g., adding or removing) of one or more specific resources to/from one or more of the app containers (e.g. storage resources, processing resources, bandwidth resources, etc.); 4) rebalancing traffic between different container clusters; 5) changing the allocation of processing and/or storage resource allocated to a container cluster; etc.

Thus, there is a relationship between the information provided to update service 144 and the container management configuration changes that update service 144 decides to make. For example, in response to the analysis of the current status information indicating that the volume of traffic to a given one of the container clusters (or a specific application within that container cluster) has increased, is increasing, or is expected to increase, update service 144 may determine that additional app containers should be added to the container cluster. As another example, if the analysis of the current status information indicates that the usage of processing resources allocated to the container cluster has increased, is increasing, or is expected to increase, update service 144 may determine that additional processing resources are to be allocated to the container cluster. Similarly, there are a variety of possible container management configuration changes that may be implemented responsive to the above examples of the analysis performed (e.g., see the first through fifth examples above). For instance, with regard to the fifth example above (the analysis may be based on: 1) combining the current status information and predictions based on historical data; and 2) comparing the result of the combining against service owner provided configuration data (e.g., threshold(s))), the container management configuration changes may include adding app containers to one or more of the container clusters. More specifically, assume that for a given application in a given contain cluster, the analysis and response includes: 1) using historical data to predict a volume of traffic increase in the near future for the application in that container cluster; 2) combining the prediction with current volume of traffic from the current status information to get a predicted total volume of traffic; 3) determining that the predicted total volume of traffic exceeds a threshold volume of traffic in configuration data provided by the service owner of the application; 4) determining to increase the number of app containers (by spinning up additional app containers running instances of that application) in that container cluster by a number expected to be able to handle the predicted total volume of traffic.

Update service 144 provides the container management configuration changes to SC engine 122, which then provides the changes to the workflow engines 124 in the container clusters that are to be changed, while monitoring service 140 provides data indicative of the health of the app containers to the workflow engines as described above.

Responsive to receiving the container management configuration changes, SC engine 122 attempts to implement instructions provided by the release manager 110 and the update service 144 at different times. The instructions provided by the update service 144 pertain to container management configuration changes, and SC engine 122 attempts to implement those instructions by causing a runtime config update to be sent to a workflow engine 124 within each container cluster. On the other hand, the instructions provided by the release manager 110 pertain to processing the currently selected stagger, and SC engine 122 attempts to implement those instructions by causing an app config update to be sent to the workflow engine 124 within each of the subset of container clusters in the current stagger as was described above.

The App(s), of which there are instances in the containers 134, provide services. A given service may be provided by a single one of the Apps (e.g., AppA), or by a set of one or more of the Apps (e.g., AppA and AppB; AppA through AppK; etc.). In some implementations, the configuration of each service is controlled by a service owner. Thus, while FIG. 1A and FIG. 1B show a single service owner for managing the Apps within containers 134 (e.g., one service owner for AppA through AppK), there may be different service owners for different subsets or even individual ones of the Apps. Also, each service owner may represent a single user or a group of users. There are various ways in which the operations/blocks in FIG. 1A and FIG. 1B may be deployed. For instance, in some implementations each of the container clusters 130 along with an instance of the COS engine 138 may be implemented within a different datacenter. The rest of the blocks in FIG. 1A may be within one or more multiple datacenters. By way of a first example: 1) the release engine 109, release manager store 102, container cluster store 128, monitoring service 140 and logging service 142 (as well as the update service 144 in some implementations) may be implemented one datacenter (which may or may not include one of the container clusters 130); and 2) the SC Repo 104, build system 106, and config dispatcher 108 may be implemented in one or more other datacenters. In a second example, the deployment may be similar but the release manager store 102, SC store 112, and the release manager 110 may be implemented in a datacenter with the SC Repo 104, but the SC engine 122 implemented in the datacenter with the container cluster store 128, monitoring service 140, and logging service 142 (as well as the update service 144 in some implementations). Other deployments in which the blocks in FIG. 1A and FIG. 1B are distributed differently between datacenters are possible.

FIG. 1C

FIG. 1C is a block diagram illustrating a stagger determiner according to some example implementations. As discussed above, some implementations of the feature-based release orchestration system may include automatically determining a stagger configuration. In this case, release manager 110 may include a stagger determiner 118 configured to determine part or all of a stagger configuration (one, more than one, or all of a set of one or more of the attributes of the stagger configuration) based on one or more provided inputs that reflect a set of one or more stagger criteria. In some implementations, the stagger criteria includes a representation of a risk level 180 of the feature-based release (e.g. low vs. standard vs. significant) that is provided to stagger determiner 118. In addition, FIG. 1C shows an implementation in which: 1) the config-based release artifact includes identifiers of the container clusters 130 involved in the current feature-based release; and 2) the container cluster store 128 includes a data structure to store, according to container cluster identifier 186, container cluster characteristics 184, from which may be accessed characteristics based on the release's container cluster identifiers 182. Depending on the implementation, these characteristics may identify (including potentially how to communicate with) workflow engine 124 (shown as workflow engine 188), as well as other characteristics (e.g., geographic region 190, sub-region 192, environment type 194, etc.) that may be used by stagger determiner 118 to determine the staggers. FIG. 1C also shows that stagger determiner 118 may optionally be divided up into different operations depending on implementation and/or what parts of the stagger configuration will be determined. Specifically, these operations may include: 1) number of staggers determiner 170 to determine the number of staggers to use; 2) container cluster sub-set determiner 172 to determine which container cluster(s) to include in which staggers; and 3) stagger order determiner 174 to determine the order for the staggers. The resulting staggers are illustrated as stagger 176-A to stagger 176-E.

Different implementations may provide the risk level 180 from different ones of the sources (e.g., input by a user, selected based on which user/group/department submits the changes included in the application config file, included in the change case template, included in the release declaration template, etc.). For example, one factor used in some implementations is environment type (e.g. pre-production, commercial, government, etc.). In this example, the environment type 194 may not be present in the container cluster characteristics 184, and the risk level may be set to low for pre-production, standard for commercial, and significant for government; and the source in which the risk level is stored may be the change case template. As another example, one factor may be the type of transactions handled by the app (e.g., low for internal transactions (e.g., services that are internal to an organization, do not have a user interface for users outside of an organization, and are not part of the sequence flow for users outside of an organization), standard for backend system transactions (e.g., a database engine which may not have a user interface for users outside of an organization, but is part of the sequence flow for users outside of an organization), and significant for external transactions (e.g., a service that has a user interface for users outside of an organization); and the source in which the risk level is stored may be the application config file, the change case template, or the release declaration template, etc.). As a third example, one factor may be which one of different sets/groups/departments of users are submitting the feature-based release (e.g., low for a first group of users, standard for a second, and significant for a third), assuming these different sets of users are authorized to cause different types of feature-based releases (e.g., some groups may be authorized to turn on features, while other are authorized to turn them off; a group responsible for turning on a feature for the first time, vs a group responsible for turning on and off features based on different customers' requests; etc.); and the source in which the risk level is stored may be the change case template identified in the release declaration template.

While some implementations use the risk level 180 as provided by the source, other implementations may include a risk level modifier 195 that determines whether and how to adjust the risk level 180 higher or lower based on one or more different inputs, such as: 1) historical release success data (stored in a release history store (not shown) maintained by the release engine 109, release manager 110, or release declaration engine 116) pertaining to previous releases (e.g. submitted by the same user/group/department or relating to the same app instances or container clusters, etc.) may be used as an indicator to adjust the risk level lower or higher (e.g. lower if a threshold number of previous releases were deemed successful, higher if previous a threshold number of releases were deemed unsuccessful, etc.); 2) build system testing coverage/validation output pertaining to the outcome of testing (e.g. whether testing coverage was less than 100% or other threshold (indicating higher risk)) performed by build system 106 during the generation of the config-based release artifact; 3) data in the committed app config file that pertains to rollback confirmation (e.g. whether previous testing confirmed that a rollback was possible (indicator of lower risk); etc. Based on the one or more different inputs, risk level modifier 195 may adjust the risk level 180 higher, lower, or not at all, and provide the risk level 180 to the stagger determiner 118. In some implementations, risk level modifier 195 may use machine-learning techniques (e.g. a rank adaptive algorithm) to compute and generate a risk model and adjust the risk level based on the risk model.

Based on the risk level 180 (as provided by the source or adjusted by the risk level modifier 195 as described above), the stagger determiner 118 will determine a set of one or more attributes of the stagger configuration (e.g., the number of staggers, the make-up of each stagger (i.e. the particular subsets of one or more container clusters included in each one of the staggers), an ordering for the staggers, etc.).

For example, the stagger determiner 118 may: 1) choose a smaller number of staggers for a low risk level and a larger number of staggers for higher risk levels (meaning there will be fewer container clusters in each stagger); 2) include a smaller number of container clusters in one or more of the initial staggers for higher risk levels as compared to lower risk levels; etc. This is done to reduce the impact of a release for releases with a higher risk level.

The above examples illustrate how the stagger determiner 118 may determine the number of container clusters in one or more of the staggers. Additionally or alternatively to determining the number of container clusters in the staggers, the stagger determiner 118 may determine the make-up of each stagger and/or an ordering for the staggers. For example, since the stagger determiner 118 may have access to information (e.g., from container cluster store 128) regarding the different container clusters and where they are physically located (e.g., geographic regions 190 and/or sub-regions 192 where the container clusters are located) the stagger determiner 118 may: 1) choose to put all container clusters in the same geographic region or sub-region in the same stagger when the risk level is low and put different ones of the container clusters in the same geographic region or sub-region in different staggers when the risk level is high; 2) order the staggers according to a particular ordering when the risk level is high (e.g. staggers with container clusters where critical traffic is routed get processed last, etc.), and a different ordering when the risk is low or medium (e.g. by selecting an ordering that prioritizes other considerations (e.g. geographic location(s), volume of traffic, type of traffic (e.g. pre-production, commercial, government, etc.), cluster characteristics (e.g. customer footprints, volume of traffic per customer, revenue generated per customer, etc.)), etc.); etc.); etc.

In some implementations, the above examples are combined such that the source of the risk level 180 is the identified change case template, and the stagger determiner 118 uses the risk level 180 to determine the stagger configuration, which includes the number of staggers, the make-up of each stagger, and an ordering for the staggers. For example, 1) if the risk level is low, then stagger determiner 118 may determine the make-up of and ordering of each stagger based on geographic location, and the number of staggers based on environment type; 2) if the risk level is medium, then stagger determiner 118 may determine the make-up of each stagger based on volume of traffic, and the number of staggers and ordering of each stagger based on traffic type; 3) if the risk level is high, then stagger determiner 118 may determine the make-up of each stagger based on a combination of geographical location and environment type, the number of staggers based on volume of traffic, and the ordering of the staggers based on environment type, etc.

It should be noted that while stagger determiner 118 is shown in FIG. 1A as part of the release manager 110 and the autonomous configuration-based release orchestration system, in some implementations stagger determiner 118 could be: 1) part of a different component or service in the autonomous configuration-based release orchestration system (e.g. build system 106, etc.); 2) a standalone component or service in the autonomous configuration-based release orchestration system; 3) a standalone component or service not part of an autonomous configuration-based release orchestration system (e.g. it can receive input indicative of one or more container clusters and a risk level and output a stagger configuration based on the provided inputs, etc.); 4) a component or service of a different system (e.g. an artifact-based release orchestration system in which new container clusters that include the release are spun up, traffic is gradually transitioned from the old container clusters that don't include the release to the new container clusters that include the release following which the old container clusters are shut down, etc.), etc.

FIG. 1D

FIG. 1D is a block diagram illustrating a release seeking goal determiner according to some example implementations. As described above, some implementations of the feature-based release orchestration system may include, as a release customization, a release seeking goal. The release seeking goal indicates a condition (that may include one or more compound conditions) that must evaluate to "true" in order for the feature-based release not to be rolled back. For example, a release seeking goal may specify that the feature-based release must have been deployed successfully to 100% of the staggers, 80% of the staggers, certain specific staggers, geographic regions, datacenters, etc. As another example, the release seeking goal may stipulate that the feature-based release must be successfully deployed to specific container cluster(s) irrespective of which stagger those container clusters are in. As another example, the condition of the release seeking goal may include logic (e.g., logical operators such as AND, OR, XOR, etc.); for example: specific container clusters X AND Y; specific container clusters X OR Y, etc.

The release seeking goal may be specified in one of the sources discussed above. In FIG. 1D, the release seeking goal 196 is received by a release seeking goal determiner 198 that may be implemented as part of release declaration engine 116, which as described above is part of the release manager 110. In these implementations, upon release manager 110 receiving from SC engine 122 the data indicative of whether the feature-based release was successfully deployed to the current stagger, release manager 110 (via the release seeking goal determiner 198) may determine, based on the received data, whether the release seeking goal 196 can still be met. If the release seeking goal 196 can still be met and there are more staggers to process, release manager 110 processes the next stagger. Otherwise, if there are no more staggers left to process, the feature-based release deployment is complete. On the other hand, if release manager 110 (via the release seeking goal determiner 198) determines based on the data received from SC engine 122 that the release seeking goal 196 can no longer be met (e.g. the feature-based release failed to deploy successfully to too many staggers) release manager 110 may determine to stop or to roll back the feature-based release.

It should be noted that while release seeking goal determiner 198 is shown in FIG. 1D as part of release declaration engine 116, in some implementations release seeking goal determiner 198 could be: 1) part of a different component or service in the autonomous configuration-based release orchestration system (e.g. of release manager 110, release engine 109, etc.); 2) a standalone component or service in the autonomous configuration-based release orchestration system; 3) a standalone component or service not part of an autonomous configuration-based release orchestration system; 4) a component or service of a different system (e.g. an artifact-based release orchestration system in which new container clusters that include the release are spun up, traffic is gradually transitioned from the old container clusters that don't include the release to the new container clusters that include the release following which the old container clusters are shut down, etc.), etc.

It should be noted that the various actors shown in FIGS. 1A-1D can use any communication scheme (push, pull, doorbell, etc.) to communicate with one another. For example, SC engine 122 may push data to SC communicator 126, or SC communicator may pull data from SC engine 122, etc.

FIG. 2A

Figure 2A:
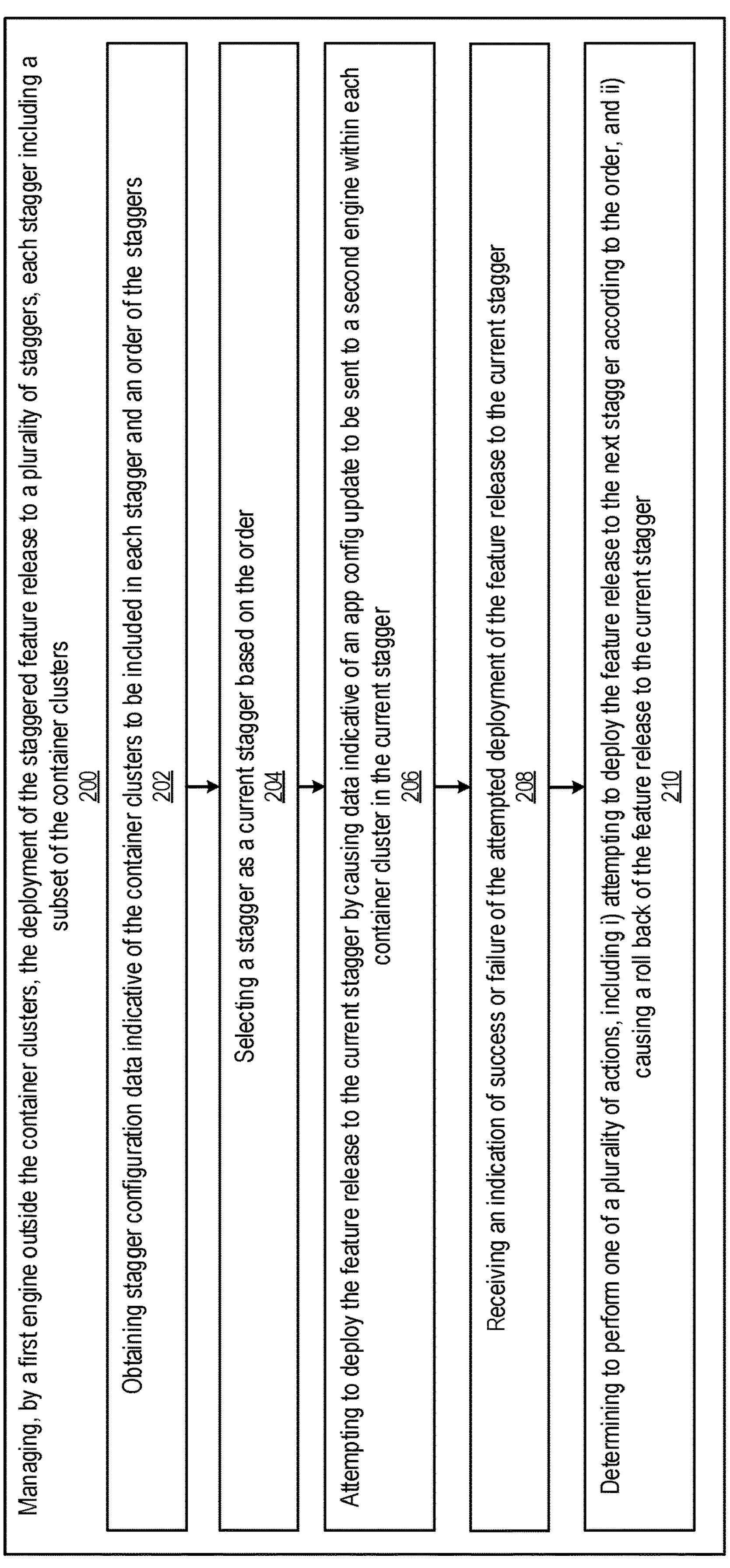
FIG. 2A is a flow diagram illustrating a method for autonomous configuration-based release orchestration that supports deployment of a staggered feature release to a plurality of container clusters in different staggers according to some example implementations.

FIG. 2A is a flow diagram illustrating a method for autonomous configuration-based release orchestration that supports deployment of a staggered feature release to a plurality of container clusters in different staggers according to some example implementations. The container clusters include instances of an application that has a plurality of features where each feature has a state that may be changed (e.g., between enabled and disabled).

At block 200, a first engine (e.g. release engine 109) outside the container clusters manages the deployment of the staggered feature release to a plurality of staggers in which each stagger includes a subset of the container clusters. Container clusters 130A-130M of FIG. 1A is an example of a subset of container clusters in one of the staggers. Managing the deployment of the staggered feature release to the plurality of staggers is further described below with reference to blocks 202-210. In some implementations, the first engine, as part of managing the deployment at block 202, also generates configuration data for managing the deployment such as, e.g., a release declaration. In those implementations, as part of generating configuration data, the first engine may retrieve a release declaration template from a store, obtain a config-based release artifact that was generated by a build system, and populate the release declaration template with information obtained from the config-based release artifact thereby generating the release declaration.

At block 202 the first engine obtains stagger configuration data indicative of the subset of container clusters to be included in each of the plurality of staggers and indicative of an order of the staggers (e.g. first stagger, second stagger, etc.). What is included in obtaining the stagger configuration data may differ in different implementations (e.g., receiving all the stagger configuration data from one of the sources; generating all the stagger configuration data (e.g. using stagger determiner 118) based on one or more inputs; a combination of the two (e.g., receiving some of the stagger configuration data and generating the rest; etc.). In some implementations, the one or more inputs include indication(s) of the geographic region(s) where the container clusters are located.

At block 204 the first engine selects one of the staggers as a current stagger based on the order. For example, the initial stagger in the order would be selected as the current stagger, the next stagger in the order would then be selected as the current stagger, etc.

At block 206 the first engine attempts to deploy the feature release to the current stagger by causing data indicative of an app config update to be sent to one or more second engines (e.g. one or more workflow engines 124) within a respective one or more container clusters in the subset of container clusters in the current stagger. The data indicative of an app config update includes an indication of which of the features of the application are to be changed to which state and, in some implementations, also includes an indication of the application (e.g. an identifier that identifies the application) that would enable a second engine within a container cluster to identify or determine which containers in that container cluster are one of the app containers. Further details of the operations of a second in response to receiving the data indicative of the app config update are discussed below with reference to FIG. 2B.

Responsive to the attempt, at block 208 the first engine receives (e.g. directly or indirectly from the workflow engines 124) an indication of the success or failure of the attempted deployment of the release to the current stagger.

At block 210, responsive to the received indication of success or failure, the first engine performs an action of a plurality of different actions. The different actions can include, e.g., i) attempting to deploy the staggered feature release to a next stagger according to the order (e.g. if the received indication indicates success and there are additional staggers to select based on the order, in which case the attempting includes selecting the next stagger in the order as the current stagger), and ii) determining to cause a rolling back of the feature release to the current stagger (e.g. if the received indication indicates failure) by, e.g. causing the state of the features of the application in at least the container clusters in the current stagger to be changed to a previous state. In some implementations, as described above, determining to cause a roll back of the current stagger can also trigger a release rollback in which all previous staggers are also rolled back.

In some implementations, the first engine can include different parts that are each responsible for different actions. For example, as previously described the first engine (e.g. release engine 109) could include the release manager 110 and the SC engine 122. The release manager 110 could perform the selecting (block 204) and the performing an action (block 210), but delegate other operations to the SC engine 122. For example, the attempting (block 206) could include the release manager 110 sending to the SC engine 122 an indication of the current stagger, thereby causing, at block 206, the SC engine 122 to send data indicative of an app config update to the plurality of workflow engines 124 and SC engine 122 receiving, at block 208, the indication of success or failure of the attempted deployment of the feature release to the current stagger.

FIG. 2B

FIG. 2B is a flow diagram showing operations of a second engine in response to receiving the data indicative of the app config update that was sent by the first engine (block 206).

At block 212, responsive to receiving the data indicative of the app config update from the first engine, the second engine (e.g. workflow engine 124) attempts to deploy the feature release to the one of the container clusters, as is described in further detail below with reference to blocks 214-224.

At block 214, the second engine identifies which containers within the container cluster are ones of the app containers. For example, as described above, the data indicative of the app config update may include an indication of the application, such as an identifier that identifies the application.

At block 216, the second engine changes the state of features of the application as indicated in the data indicative of an app config update. For example, as described above, the state of features may be changed (e.g., between enabled and disabled, such as: a first set of features may be changed from enabled to disabled or from disabled to enabled; or a first set of features may be changed from enabled to disabled while a second set of features may be changed from disabled to enabled, and a third set of features may not be changed, etc.).

At block 218, the second engine causes the state change(s) to be applied (e.g. by signaling the appropriate app containers, instructing COS engine to signal and/or restart the app container(s), as described above).

At block 220, the second engine determines an indication of success or failure of the attempted deployment of the release to the container cluster. This may include, e.g. testing the app containers from within the container cluster (e.g. by test and diagnostic engine 132) responsive to live traffic being routed to the app containers by an ingress gateway (e.g. Ingress Gateway/Load Balancer 131). Additionally or alternatively, second engine may determine the indication of success or failure of the attempted deployment of the release to the container cluster responsive to receiving reports from a monitor outside the cluster (e.g. monitoring service 140). In some implementations, as described above, the monitor outside the cluster may collect information regarding the state of the app containers using logs generated by the app containers, or app instances within the app containers, and report the collected information to second engine.

At block 222, responsive to the indication indicating failure, the second engine causes a roll back of the container cluster (e.g., by changing the states of the features back to the states the features were in prior to the attempted deployment of the release) and optionally causing the changes to be applied (e.g. by signaling the app containers, by triggering COS engine to restart or signal the app containers, etc.).

At block 224, the second engine provides to the first engine the indication of the success or failure of the attempted deployment of the release to the container cluster. As described above, the indication can be provided to the first engine using, e.g., one or more webhooks.

FIG. 3

FIG. 3 is a flow diagram illustrating a method for both autonomous container management configuration changes to container clusters during runtime and autonomous configuration-based release orchestration.

At block 300 a release manager (e.g. release manager 110) outside of the container clusters manages a staggered feature release that includes a plurality of staggers, an order for the staggers, and which subset of the container clusters is in each stagger. Responsive to a release, flow passes to block 306.

At block 302 a logging service (e.g. logging service 142) manages logs generated by the plurality of container clusters and/or the app containers within the plurality of container clusters. In some implementations, managing logs includes aggregating logs from different log sources, and converting formats if and as needed. The logs provide raw data that can be analyzed to determine runtime configuration changes to the container clusters that may be needed to keep the container clusters operating efficiently based on current conditions. The raw data or the analyzed data could provide information, such as one or more of current status information, configuration data, and historical data. The information provided in the raw data or the analyzed data could include such things as volume of traffic being received by the app containers in each of the container clusters, the CPU load of electronic devices running the app containers, and storage requirements of the app containers.

At block 304 an update service (e.g. update service 144) outside of the container clusters and coupled to the logging service, determines container management configuration changes based on analysis of data contained within the logs and possibly combined with data from another source (e.g. configuration files, etc.). These container management configuration changes pertain to runtime configuration of the container clusters, and the changes that are determined can include such things as the number of app containers to run within each one of the clusters (e.g. by adding or removing existing app containers), how resources are to be allocated to each one of the app containers in one or more of the clusters, etc. In some implementations, the update service could perform the analysis of the data, while in other implementations a different entity could perform the analysis and provide results of the analysis to the update service, as was described above with reference to FIG. 1B. The analysis of the data could include, e.g. predictions of one or more events that may be likely to occur and that pertain to one or more container clusters and/or app containers. For example, as described above, the events that may be predicted to occur can be, e.g. changes in traffic volume, changes in resource usage/consumption by the clusters or containers, changes in respect of resources that may be made available to the containers or clusters, etc.

At block 306 a shared engine (e.g. SC engine 122) outside of the container clusters and coupled to the release manager and the update service, attempts to implement instructions provided by the release manager and the update service at different times, where the instructions provided by the release manager pertain to one of the staggers selected by the release manager as the current stagger.

In some implementations, determining container management configuration changes (block 304) can include identifying one or more container clusters that are to receive one or more of the configuration changes.

Block 306 is performed each time instructions are sent by the release manager or the update service. In some implementations, the system can include a second engine (e.g. workflow engine 124) where each container cluster includes an instance of the second engine. Although not specifically shown in FIG. 1B, in these implementations, the attempting to implement the instructions provided by the update service (block 306) can include causing a runtime config update to be sent to the second engine within the container cluster that is to receive the one or more configuration changes. In this case, the flow ends. Also in these implementations, the attempting to implement instructions provided by the release manager (block 306) can include i) causing an app config update to be sent to the second engine within each container cluster in the current stagger, and ii) receiving an indication of success or failure of the attempted deployment of the feature release to each of the container clusters in the current stagger.

At block 308 the release manager receives an indication of success or failure of the attempted deployment of the feature release to the current stagger.

At block 310 the release manager, responsive to the indication of success or failure of the attempted deployment of the feature release, determines to perform one of a plurality of actions, including i) attempting to deploy the feature release to a next one of the plurality of staggers according to the order (e.g. if the received indication indicates success of the attempted deployment), and ii) rolling back the feature release (e.g. if the received indication indicates failure of the attempted deployment). As described above, a determination to roll back can include rolling back the current stagger only (a stagger rollback), or rolling back the current stagger and all previous staggers (a release rollback).

FIG. 4

Figure 4:
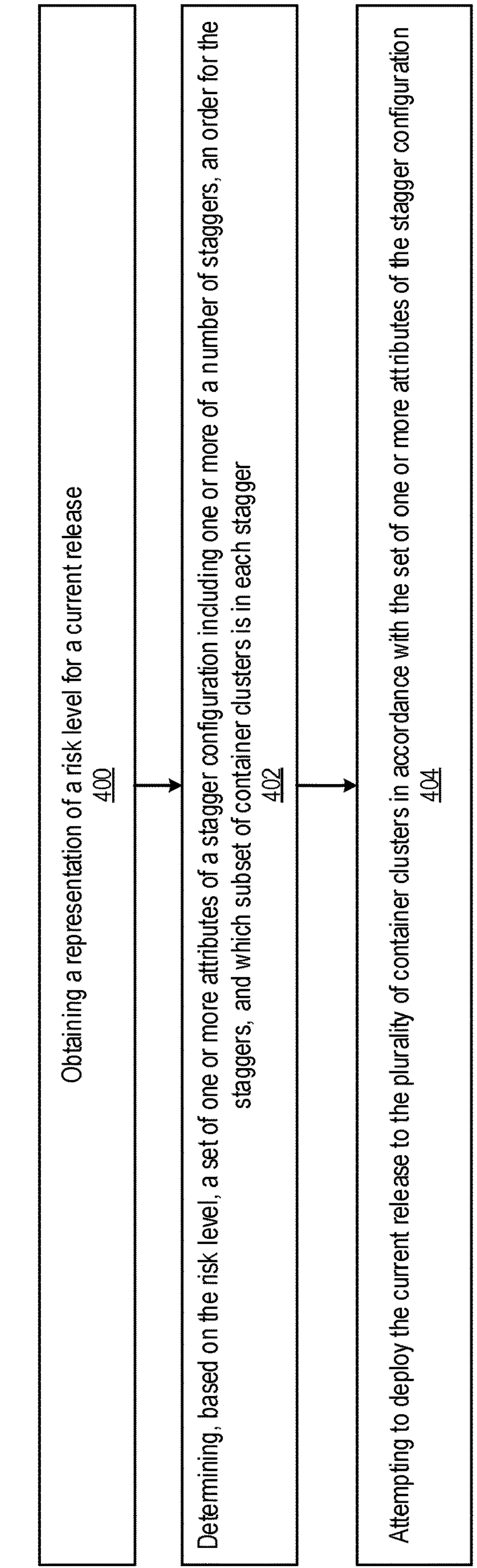
FIG. 4 is a flow diagram illustrating a method for autonomous release orchestration according to some example implementations.

FIG. 4 is a flow diagram illustrating a method for autonomous release orchestration according to some example implementations. These implementations support a risk-based approach to determining a stagger configuration.

At block 400 a release manager (e.g. release manager 11) obtains a representation of a risk level for a current release. As described above, the representation of the risk level can be obtained from one or more sources (e.g. a release declaration template, a change case template, etc.). The one or more sources may be retrieved using one or more identifiers that identify the specific one of the sources to retrieve. In some implementations, as described above, an identifier of one of several different change case templates is first obtained from a release declaration template and, using the identifier, the corresponding one of the change case templates is identified, and the representation of the risk level is obtained from the identified change case template.

At block 402 the release manager determines, based at least in part on the representation of the risk level, a set of one or more attributes of a stagger configuration, where the set of one or more attributes of the stagger configuration includes one or more of a number of staggers, an order for the staggers, and which subset of container clusters is in each stagger. Determining the set of one or more attributes based at least in part on the representation of the risk level could include, e.g. i) determining which of the container clusters to include in which of the staggers based partly on a geographic region where the container clusters are located (e.g. determining whether to put clusters located in the same geographic region in the same stagger or different staggers, etc.) and determining one or more of the other attributes (e.g. number and order of the staggers) based on the risk level; ii) determining both the number and order of the staggers based on the risk level and determining which clusters to include in which stagger based on the geographic regions of where the clusters are located; iii) determining the number of staggers based at least partly on the risk level where a higher risk level results in more staggers and a lower risk level results in fewer staggers, and determining which clusters to include in which stagger is based on the risk level and on relationships between clusters (e.g. same or different geographic region), and determining the stagger order is based on risk level and container characteristics (e.g. traffic volume, environment type, etc.); etc. See also other examples described earlier herein.

At block 404 the release manager attempts to deploy the current release to the plurality of container clusters in accordance with the set of one or more attributes of the stagger configuration. As described above with reference to FIG. 2A, attempting to deploy the release to the plurality of container clusters can include the release manager performing one or more of operations described at blocks 202-210 of FIG. 2A.

FIG. 5

FIG. 5 is a flow diagram illustrating a method for autonomous configuration-based release orchestration according to some other example implementations. In these implementations, the autonomous configuration-based release includes a configurable release seeking goal.

At block 500 a release manager (e.g. release manager 110) obtains a representation of a release seeking goal for a staggered feature release that includes a plurality of staggers, an order for the staggers, and which subset of container clusters is in each stagger. As described above, the release seeking goal is a condition that if not met requires a release level rollback of the staggered feature release. Many types of conditions are possible including compound conditions and logical operators, as described above. For example, a condition may specify that i) a threshold number or percentage of container clusters must have been processed successfully across all the staggers; ii) a set of one or more specific container clusters (e.g. chosen based on traffic volume, environment type, etc.) must have been processed successfully irrespective of which container clusters are in which staggers; iii) a threshold percentage of staggers must have been successfully processed; etc. In this context, a stagger or container cluster being "processed successfully" means that based on received indications of success or failure of the attempted deployment of the release to the stagger or the container cluster (as the case may be), the release was successfully deployed to that stagger or that container cluster.

The release seeking goal can be obtained from one or more different sources as described above, e.g. from a config-based release artifact such as may be generated by a build system (e.g. a CI/CD system). In order to obtain the config-based release artifact, some implementations may include obtaining an identifier of a config-based release artifact from a config dispatcher (e.g. config dispatcher 108), and obtaining the config-based release artifact from a store based on the identifier.

At block 502 the release manager selects, according to the order of the staggers, an unprocessed one of the staggers as the currently selected stagger.

At block 504 the release manager processes the currently selected stagger. Processing the currently selected stagger includes: i) at block 506 attempting to cause a deployment of the feature release to the subset of the container clusters in the currently selected stagger; ii) at block 508 receiving an indication of success or failure of the attempted deployment of the feature release to the currently selected stagger; and iii) at block 510 determining whether to roll back the currently selected stagger based on the indication.

After processing the currently selected stagger, at block 512 the release manager determines whether the release seeking goal can still be met, as was described above including through examples using various types of release seeking goals.

At block 514 the release manager determines to perform one of a plurality of actions, including i) causing the release level rollback of the staggered feature release if the condition of the release seeking goal can no longer be met; and ii) repeating, based on the currently selected stagger having been processed, the selecting, the processing, and the determining. The release level rollback involves rolling back the currently selected stagger as the stagger being processed, as well as rolling back any container cluster in a previously processed stagger on which the feature release was successfully deployed to (and therefore was not already rolled back as part of a cluster-level rollback or stagger-level rollback.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, machine, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 6A:
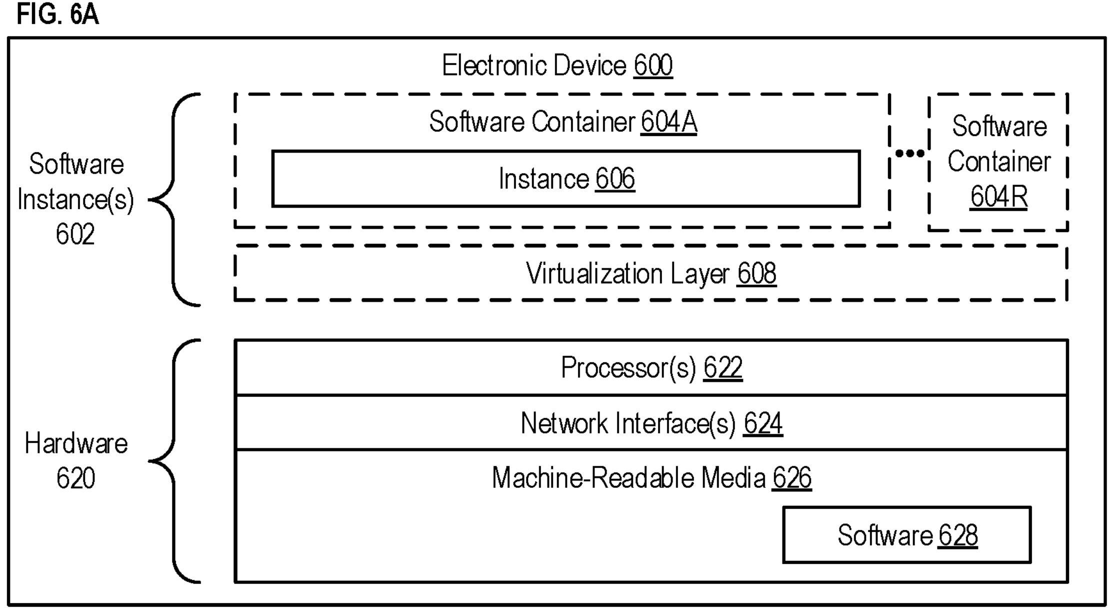
FIG. 6A is a block diagram illustrating an electronic device 600 according to some example implementations.

FIG. 6A is a block diagram illustrating an electronic device 600 according to some example implementations. FIG. 6A includes hardware 620 comprising a set of one or more processor(s) 622, a set of one or more network interfaces 624 (wireless and/or wired), and machine-readable media 626 having stored therein software 628 (which includes instructions executable by the set of one or more processor(s) 622). The machine-readable media 626 may include non-transitory and/or transitory machine-readable media.

In one implementation: 1) each of the clients is implemented in a separate one of the electronic device 600 (e.g., in end user devices where the software 628 represents the software to implement clients to interface directly and/or indirectly (e.g., software 628 represents a web browser, a native client, a portal, a command-line interface, and/or an application programming interface (API) based upon protocols such as Simple Object Access Protocol (SOAP), Representational State Transfer (REST), etc.)) with servers; 2) servers are implemented in a separate set of one or more of electronic device 600 (e.g., a set of one or more server devices where the software 628 represents the software to implement the service(s) provider by the server(s)); and 3) in operation, the electronic devices implementing the clients and the servers would be communicatively coupled (e.g., by a network) and would establish between them (or through one or more other layers and/or or other services) connections for submitting requests to the server(s) and returning responses to the clients. Other configurations of electronic devices may be used in other implementations (e.g., an implementation in which the client and a server are implemented on a single one of electronic device 600).

During operation, an instance of the software 628 (illustrated as instance 606 and referred to as a software instance; and in the more specific case of an application, as an application instance) is executed. In electronic devices that use compute virtualization, the set of one or more processor(s) 622 typically execute software to instantiate a virtualization layer 608 and a set of one or more software containers, shown as software container 604A to software container 604R (e.g., with operating system-level virtualization, the virtualization layer 608 may represent a container engine (such as Docker Engine by Docker, Inc. or rkt in Container Linux by Red Hat, Inc.) running on top of (or integrated into) an operating system, and it allows for the creation of multiple software containers (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 628 is executed within the software container 604A on the virtualization layer 608. In electronic devices where compute virtualization is not used, the instance 606 on top of a host operating system is executed on the "bare metal" electronic device 600. Instances of the software 628, as well as the virtualization layer 608 and the software containers if implemented, are collectively referred to as software instance(s) 602.

Alternative implementations of an electronic device may have numerous variations from that described above. For example, customized hardware and/or accelerators might also be used in an electronic device.

Example Environment

Figure 6B:
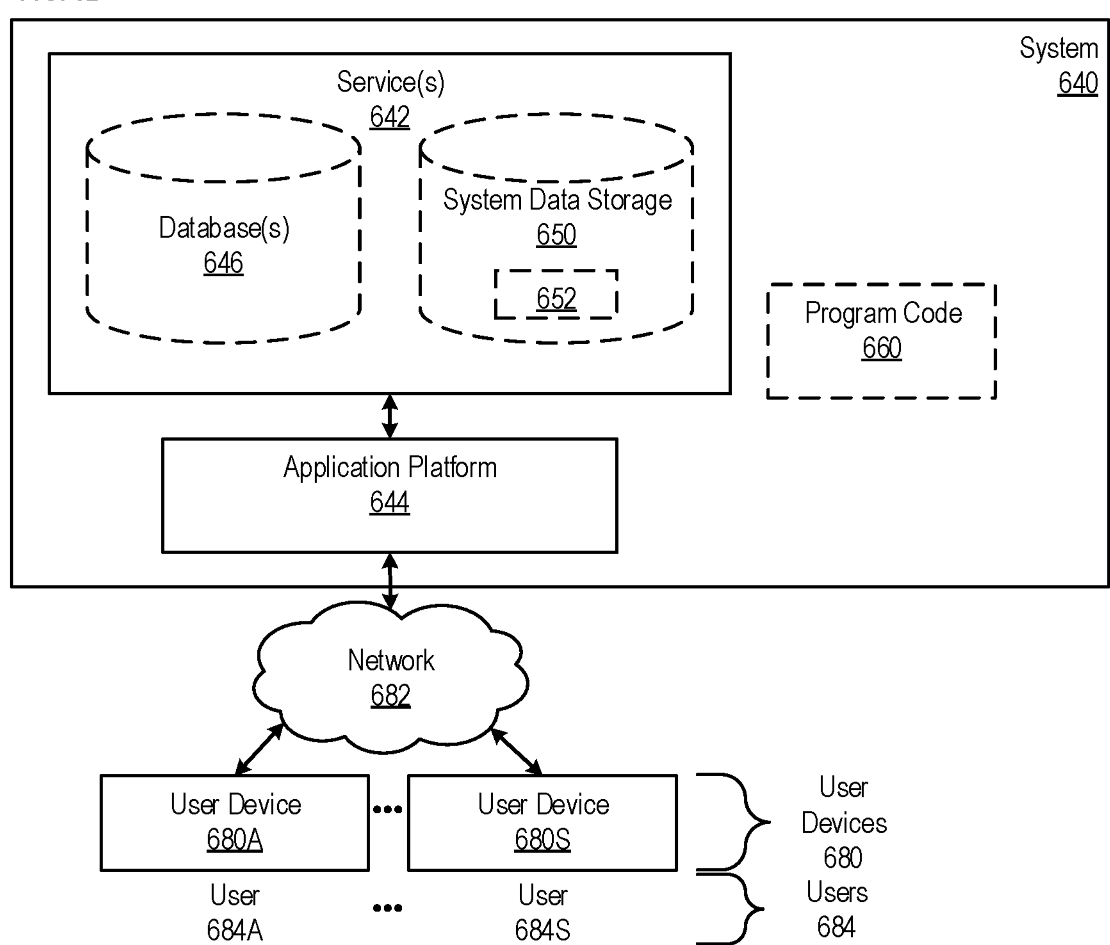
FIG. 6B is a block diagram of a deployment environment according to some example implementations.

FIG. 6B is a block diagram of a deployment environment according to some example implementations. A system 640 includes hardware (e.g., a set of one or more server devices) and software to provide service(s) 642. In some implementations the system 640 is in one or more datacenter(s). These datacenter(s) may be: 1) first party datacenter(s), which are datacenter(s) owned and/or operated by the same entity that provides and/or operates some or all of the software that provides the service(s) 642; and/or 2) third-party datacenter(s), which are datacenter(s) owned and/or operated by one or more different entities than the entity that provides the service(s) 642 (e.g., the different entities may host some or all of the software provided and/or operated by the entity that provides the service(s) 642). For example, third-party datacenters may be owned and/or operated by entities providing public cloud services (e.g., Amazon.com, Inc. (Amazon Web Services), Google LLC (Google Cloud Platform), Microsoft Corporation (Azure)). "Cloud" services provide shared resources, software, and information to computers and other electronic devices upon request. In cloud computing environments, software can be accessible over the internet rather than installed locally on in-house computer systems. Cloud services typically involve over-the-internet provision of dynamically scalable and often virtualized resources. Technological details can be abstracted from the users, who no longer have need for expertise in, or control over, the technology infrastructure "in the cloud" that supports them.

The system 640 is coupled to user devices 680 (shown as user device 680A to user device 680S) over a network 682. The service(s) 642 may be on-demand services that are made available to users 684 (shown as user 684A to user 684S) working for one or more entities other than the entity which owns and/or operates the on-demand services (those users sometimes referred to as outside users) so that those entities need not be concerned with building and/or maintaining a system, but instead may make use of the service(s) 642 when needed (e.g., when needed by the users). The service(s) 642 may communicate with each other and/or with one or more of the user devices 680 via one or more APIs (e.g., a REST API). In some implementations, the user devices 680 are operated by the users 684, and each may be operated as a client device and/or a server device. In some implementations, one or more of the user devices 680 are separate ones of the electronic device 600 or include one or more features of the electronic device 600.

In some implementations, the system 640 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant typically includes a group of users with access to at least some of the same data/functionality with the same or similar privileges/permissions. Tenants may be different entities (e.g., different companies, different departments/divisions of a company, and/or other types of entities), and some or all these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all the vendors' data. As another example, in the context of Platform as a Service (PAAS), one set of tenants may be third-party application developers providing applications/services and another set of tenants may be customers of different ones or all the third-party application developers.

Multi-tenancy can be implemented in different ways. In some implementations, a multi-tenant architecture may include software instance(s) that are shared by multiple tenants (e.g., a single database instance share by multiple tenants, sometime referred to as a multi-tenant database; a single application instance shared by multiple tenants, sometimes referred to as a multi-tenant application; a single application instance and a single database instance shared by multiple tenants; an application instance per tenant and a database instance shared by multiple tenants; a single application instance share by multiple tenants and a database instance per tenant).

In one implementation, the system 640 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 640 may include an application platform 644 that enables PAAS for creating, managing, and executing one or more applications developed by the provider of the application platform 644, users accessing the system 640 via one or more of the user devices 680, or third-party application developers accessing the system 640 via one or more of user devices 680.

In some implementations, one or more of the service(s) 642 may use one or more database(s) 646 and/or system data storage 650 (which stores system data 652). In certain implementations, the system 640 includes a set of one or more servers that are running on server electronic devices and that are configured to handle requests for any authorized user associated with any tenant (there is no server affinity for a user and/or tenant to a specific server). The user devices 680 communicate with the server(s) of system 640 to request and update tenant-level data and system-level data hosted by system 640, and in response the system 640 (e.g., one or more servers in system 640) automatically may generate one or more Structured Query Language (SQL) statements (e.g., one or more SQL queries) that are designed to access the desired information from the database(s) 646 and/or system data storage 650.

In some implementations, the service(s) 642 are implemented using virtual applications dynamically created at run time responsive to queries from the user devices 680 and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 644 includes an application setup mechanism that supports application developers' creation and management of applications, which may be saved as metadata by save routines. Invocations to such applications may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3$^{rd}$ Generation Partnership Project (3GPP) protocol, a 4$^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 640 and the user devices 680.

Each of the user devices 680 (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 640. For example, the user interface device can be used to access data and applications hosted by system 640, and to perform searches on stored data, and otherwise allow one or more of users 684 to interact with various GUI pages that may be presented to the one or more of users 684. The user devices 680 may communicate with system 640 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more the user devices 680 may include an HTTP client, commonly referred to as a "browser," for sending and receiving HTTP messages to and from server(s) of system 640, thus allowing one or more of the users 684 to access, process and view information, pages and applications available from system 640 over network 682.

As previously described, there are a variety of ways to deploy the blocks in FIG. 1A and FIG. 1B. Within the deployment environment of FIG. 6B, parts or all of the blocks/operations shown in FIGS. 1A-5 may similarly be distributed differently. By way of a first example: 1) the service owner in FIG. 1A or B may be one of the users 684; 2) each of the container clusters 130 along with one instance of the COS engine 138 may be implemented within one instance of system 640 within a datacenter; and 3) the rest of the blocks in FIG. 1A and FIG. 1B implemented within one or more other datacenters (not shown). By way of a second example: 1) the service owner in FIG. 1A or B may be one of the users 684; 2) each of the container clusters 130 along with one instance of the COS engine 138 may be implemented within one instance of system 640 within a datacenter; and 3) the rest of the blocks in FIG. 1A and FIG. 1B implemented within another instance of system 640 within a datacenter (in which case, the monitoring service 140, logging service 142, and update service 144 may, for example, be among the services 642 of that instance of system 640). Other deployments in which the blocks in FIG. 1A and FIG. 1B are distributed differently are possible.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method for autonomous configuration-based release orchestration that supports deployment of a staggered feature release to a plurality of container clusters in different staggers, wherein the container clusters include instances of an application having a plurality of features that each have a state that may be changed, the method comprising:

by a first engine outside of the container clusters, managing the deployment of the staggered feature release to a plurality of staggers, each stagger including a subset of the plurality of container clusters, the managing including:

obtaining stagger configuration data indicative of the subset of container clusters to be included in each of the plurality of staggers and indicative of an order of the staggers;

selecting one of the plurality of staggers as a current stagger based on the order;

sending data indicative of an application configuration update to a respective second engine within each container cluster of the subset of container clusters in the current stagger, wherein the data indicative of the application configuration update causes the respective second engine within each container cluster of the subset of container clusters in the current stagger to update the state of at least one of the features of the application to enabled or disabled;

receiving an indication of success or failure of the feature release to the current stagger; and responsive to the indication of success or failure, performing one of a plurality of actions, wherein the plurality of actions includes i) processing a next one of the plurality of staggers according to the order responsive to the indication indicating success, and ii) causing a roll back of the current stagger responsive to the indication indicating failure.

2. The method of claim 1, wherein the data indicative of an application configuration update includes an indication of the application, and wherein the indication of the application enables the second engines within the container clusters to identify which containers within the container clusters are one of the containers including an instance of the application.

3. The method of claim 1, wherein the first engine includes a release manager and a third engine, wherein the release manager performs the selecting and the performing one of a plurality of actions, wherein the third engine performs the sending and the receiving, and wherein the method further comprises:

by the release manager, sending an indication of the current stagger to the third engine.

4. The method of claim 1, further comprising:

by one of the second engines within a respective one of the container clusters, attempting to deploy the feature release to the respective container cluster, by:

identifying which containers within the respective container cluster are ones of the containers including an instance of the application;

changing the state of the features as indicated in the application configuration update;

causing the change to be applied to the identified containers;

determining an indication of success or failure of the attempted deployment of the feature release to the respective container cluster;

responsive to the indication indicating failure, causing a roll back of the respective container cluster; and providing, to the first engine, the indication of success or failure of the attempted deployment of the feature release to the respective container cluster.

5. The method of claim 1, further comprising:

by a monitor outside of the container clusters, collecting information regarding the deployment of the feature release to the current stagger based on logs generated by the container clusters and/or instances of the application in the current stagger, and wherein the indication of success or failure is based on the collected information.

6. The method of claim 1, wherein the stagger configuration data includes a stagger-level threshold associated with each stagger of the plurality of staggers, and wherein the first engine rolls back the staggered feature release responsive to a result of the deployment of the feature release to the current stagger being indicative of the stagger-level threshold associated with the current stagger not being met.

7. The method of claim 1, wherein the obtaining the stagger configuration data comprises:

generating the stagger configuration data based on a set of one or more inputs, wherein the set of one or more inputs includes at least indications of geographic regions where the container clusters are located.

8. An article of manufacture comprising:

a non-transitory machine-readable storage medium that provides instructions that, if executed by a set of one or more processors, are configurable to cause the set of processors to perform operations for autonomous configuration-based release orchestration that supports deployment of a staggered feature release to a plurality of container clusters in different staggers, wherein the container clusters include instances of an application having a plurality of features that each have a state that may be changed, the operations comprising, by a first engine outside of the container clusters, managing the deployment of the staggered feature release to a plurality of staggers, each stagger including a subset of the plurality of container clusters, the managing including:

obtaining stagger configuration data indicative of the subset of container clusters to be included in each of the plurality of staggers and indicative of an order of the staggers;

selecting one of the plurality of staggers as a current stagger based on the order;

sending data indicative of an application configuration update to a respective second engine within each container cluster of the subset of container clusters in the current stagger, wherein the data indicative of the application configuration update causes the respective second engine within each container cluster of the subset of container clusters in the current stagger to update the state of at least one of the features of the application to enabled or disabled;

receiving an indication of success or failure of the feature release to the current stagger; and responsive to the indication of success or failure, performing one of a plurality of actions, wherein the plurality of actions includes i) processing a next one of the plurality of staggers according to the order responsive to the indication indicating success, and ii) causing a roll back of the current stagger responsive to the indication indicating failure.

9. The article of manufacture of claim 8, wherein the data indicative of an application configuration update includes an indication of the application, and wherein the indication of the application enables the second engines within the container clusters to identify which containers within the container clusters are one of the app containers including an instance of the application.

10. The article of manufacture of claim 8, wherein the first engine includes a release manager and a third engine, wherein the release manager performs the selecting and the performing one of a plurality of actions, wherein the third engine performs the sending and the receiving, and wherein the operations further comprise:

by the release manager, sending an indication of the current stagger to the third engine.

11. The article of manufacture of claim 8, the operations further comprising:

by one of the second engines within a respective one of the container clusters, attempting to deploy the feature release to the respective container cluster, by:

identifying which containers within the respective container cluster are ones of the containers including an instance of the application;

changing the state of the features as indicated in the application configuration update;

causing the change to be applied to the identified containers;

determining an indication of success or failure of the attempted deployment of the feature release to the respective container cluster;

responsive to the indication indicating failure, causing a roll back of the respective container cluster; and providing, to the first engine, the indication of success or failure of the attempted deployment of the feature release to the respective container cluster.

12. The article of manufacture of claim 8, the operations further comprising:

by a monitor outside of the container clusters, collecting information regarding the deployment of the feature release to the current stagger based on logs generated by the container clusters and/or instances of the application in the current stagger, and wherein the indication of success or failure is based on the collected information.

13. The article of manufacture of claim 8, wherein the stagger configuration data includes a stagger-level threshold associated with each stagger of the plurality of staggers, and wherein the first engine rolls back the staggered feature release responsive to a result of the deployment of the feature release to the current stagger being indicative of the stagger-level threshold associated with the current stagger not being met.

14. The article of manufacture of claim 8, wherein the obtaining the stagger configuration data comprises:

generating the stagger configuration data based on a set of one or more inputs, wherein the set of one or more inputs includes at least indications of geographic regions where the container clusters are located.

15. An apparatus comprising:

a set of one or more processors; and a non-transitory machine-readable storage medium that provides instructions that, if executed by the set of one or more processors, are configurable to cause the apparatus to perform operations for autonomous configuration-based release orchestration that supports deployment of a staggered feature release to a plurality of container clusters in different staggers, wherein the container clusters include instances of an application having a plurality of features that each have a state that may be changed, the operations comprising, by a first engine outside of the container clusters, managing the deployment of the staggered feature release to a plurality of staggers, each stagger including a subset of the plurality of container clusters, the managing including:

obtaining stagger configuration data indicative of the subset of container clusters to be included in each of the plurality of staggers and indicative of an order of the staggers;

selecting one of the plurality of staggers as a current stagger based on the order;

sending data indicative of an application configuration update to a respective second engine within each container cluster of the subset of container clusters in the current stagger, wherein the data indicative of the application configuration update causes the respective second engine within each container cluster of the subset of container clusters in the current stagger to update the state of at least one of the features of the application to enabled or disabled;

receiving an indication of success or failure of the feature release to the current stagger; and responsive to the indication of success or failure, performing one of a plurality of actions, wherein the plurality of actions includes i) processing a next one of the plurality of staggers according to the order responsive to the indication indicating success, and ii) causing a roll back of the current stagger responsive to the indication indicating failure.

16. The apparatus of claim 15, wherein the data indicative of an application configuration update includes an indication of the application, and wherein the indication of the application enables the second engines within the container clusters to identify which containers within the container clusters are one of the containers including an instance of the application.

17. The apparatus of claim 15, wherein the first engine includes a release manager and a third engine, wherein the release manager performs the selecting and the performing one of a plurality of actions, wherein the third engine performs the sending and the receiving, and wherein the operations further comprise:

by the release manager, sending an indication of the current stagger to the third engine.

18. The apparatus of claim 15, the operations further comprising:

by one of the second engines within a respective one of the container clusters, attempting to deploy the feature release to the respective container cluster, by:

identifying which containers within the respective container cluster are ones of the containers including an instance of the application;

changing the state of the features as indicated in the application configuration update;

causing the change to be applied to the identified containers;

determining an indication of success or failure of the attempted deployment of the feature release to the respective container cluster;

responsive to the indication indicating failure, causing a roll back of the respective container cluster; and providing, to the first engine, the indication of success or failure of the attempted deployment of the feature release to the respective container cluster.

19. The apparatus of claim 15, the operations further comprising:

by a monitor outside of the container clusters, collecting information regarding the deployment of the feature release to the current stagger based on logs generated by the container clusters and/or instances of the application in the current stagger, and wherein the indication of success or failure is based on the collected information.

20. The apparatus of claim 15, wherein the stagger configuration data includes a stagger-level threshold associated with each stagger of the plurality of staggers, and wherein the first engine rolls back the staggered feature release responsive to a result of the deployment of the feature release to the current stagger being indicative of the stagger-level threshold associated with the current stagger not being met.

* * * * *